US011507971B2

(12) United States Patent
Harrison et al.

(10) Patent No.: US 11,507,971 B2
(45) Date of Patent: *Nov. 22, 2022

(54) CRYPTOCURRENCY LOYALTY PROGRAM BASED ON TRANSACTIONAL DATA

(71) Applicant: Winklevoss IP, LLC, Wilmington, DE (US)

(72) Inventors: Thomas Hungerford Harrison, San Francisco, CA (US); Jason Daniel Camp, Oneonta, NY (US)

(73) Assignee: Gemini IP, LLC, New York, NY (US)

( * ) Notice: Subject to any disclaimer, the term of this patent is extended or adjusted under 35 U.S.C. 154(b) by 67 days.

This patent is subject to a terminal disclaimer.

(21) Appl. No.: 16/523,814

(22) Filed: Jul. 26, 2019

(65) Prior Publication Data
US 2020/0034869 A1 Jan. 30, 2020

Related U.S. Application Data

(60) Provisional application No. 62/703,801, filed on Jul. 26, 2018.

(51) Int. Cl.
*G06Q 30/00* (2012.01)
*G06Q 30/02* (2012.01)
*G06Q 20/36* (2012.01)
*G06Q 20/06* (2012.01)

(52) U.S. Cl.
CPC ..... *G06Q 30/0233* (2013.01); *G06Q 20/0658* (2013.01); *G06Q 20/3678* (2013.01); *G06Q 30/0215* (2013.01); *G06Q 30/0232* (2013.01)

(58) Field of Classification Search
CPC . G06Q 30/0207–0277; G06Q 20/3678; G06Q 20/0658; G06Q 20/405; G06Q 10/403; G06Q 20/065; G06Q 20/3672; G06Q 2220/00
See application file for complete search history.

(56) References Cited

U.S. PATENT DOCUMENTS

| | | | | |
|---|---|---|---|---|
| 2004/0054590 | A1* | 3/2004 | Redford | G06Q 30/0225 705/14.21 |
| 2005/0102188 | A1* | 5/2005 | Hutchison | G06Q 30/0601 705/39 |
| 2012/0284266 | A1* | 11/2012 | Chandraghatgi | G06F 16/355 707/737 |
| 2013/0262214 | A1* | 10/2013 | Baird | G06Q 30/0207 705/14.33 |

(Continued)

OTHER PUBLICATIONS

Bitcoin Exchange Comparison—Fees, Payment options, and Currencies—Marry Ann Callahan https://crowdsourcingweek.com/blog/bitcoin-exchange-comparison/ (Year: 2017).*

*Primary Examiner* — Kambiz Abdi
*Assistant Examiner* — Christopher Stroud
(74) *Attorney, Agent, or Firm* — Lee & Hayes, P.C.

(57) ABSTRACT

Introduced here are computer programs and associated computer-implemented techniques for purchasing, selling, and/or transferring cryptocurrency to be disbursed as a reward for using a specialized payment card. The technology allows cardholders to receive cryptocurrency for completing transactions with specialized payment cards without requiring the card-issuing financial institution directly issue the cryptocurrency.

20 Claims, 14 Drawing Sheets

(56) References Cited

U.S. PATENT DOCUMENTS

| | | | |
|---|---|---|---|
| 2015/0220958 A1* | 8/2015 | Tietzen | G06Q 30/0236 |
| | | | 705/14.15 |
| 2019/0205886 A1* | 7/2019 | Ramakrishnan | G06Q 20/10 |
| 2019/0228461 A1* | 7/2019 | Domokos | G06Q 30/0613 |
| 2019/0236561 A1* | 8/2019 | Hamilton | G06K 7/1417 |
| 2019/0318291 A1* | 10/2019 | Diriye | H04L 41/147 |
| 2019/0325473 A1* | 10/2019 | Swamidurai | G06Q 30/0233 |
| 2019/0349426 A1* | 11/2019 | Smith | H04W 84/22 |

* cited by examiner

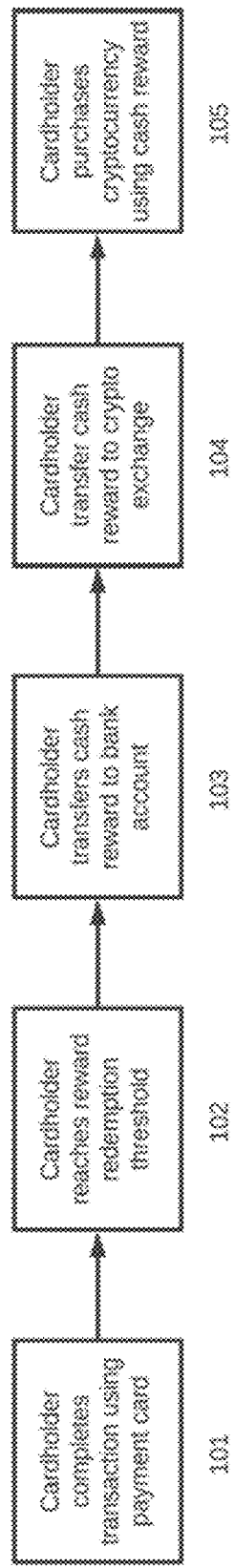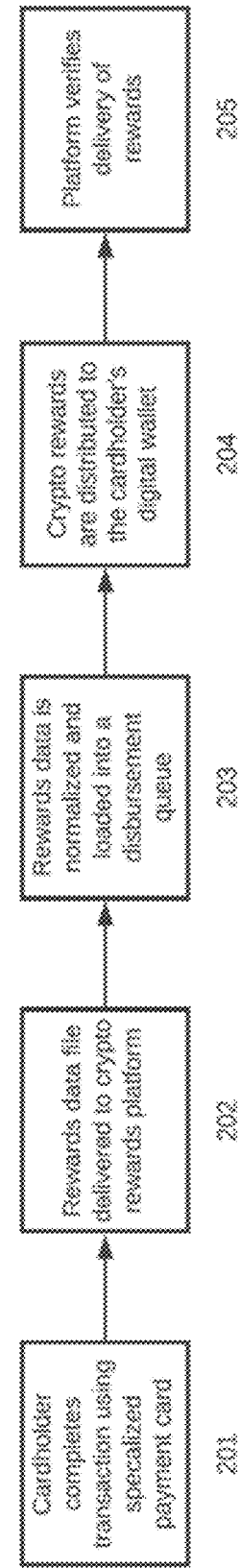
FIGURE 1
FIGURE 2

CRYPTOCURRENCY LOYALTY PROGRAM BASED ON TRANSACTIONAL DATA

CROSS-REFERENCE TO RELATED APPLICATIONS

This application claims priority to U.S. Provisional Application No. 62/703,801 filed on Jul. 26, 2018, which is incorporated herein by reference in its entirety.

TECHNICAL FIELD

Various embodiments concern computer programs and associated computer-implemented techniques for offering cryptocurrency, tokenized real-world assets, and/or digitally-native tokens to individuals as rewards based on encrypted data pertaining to transactions or financial products in general.

BACKGROUND

Loyalty programs are structured marketing strategies designed by merchants to encourage customers to continue to shop at, or use the services of, businesses associated with each program. These loyalty programs exist in a variety of different commercial contexts, and each loyalty program may have different features, rewards schemes, etc.

Some merchants distribute loyalty cards (also referred to as a "rewards cards," "points cards," "advantage cards," "club cards," or "co-brand cards") that identify the customers as a participant in a loyalty program, while other merchants simply notify the customers that they have been associated with a digital account. A customer can earn a benefit by presenting a loyalty card or an identifier (e.g., a telephone number, email address, or physical address) associated with a digital account. Generally, the benefit takes the form of either a discount on the current purchase or an allotment of points that can be used for a future purchase, reward item, etc.

Many financial institutions are associated with a loyalty program in which a percentage of the amount spent is paid back to participants. Examples of financial institutions include credit card companies (also referred to as "card issuers") and banks. These loyalty programs may encourage individuals to apply for a payment card and then use the payment card by providing a reward in the form of money, points, frequent flyer miles, etc. When a card issuer operates a loyalty program, cardholders typically receive between 0.5% and 2.0% of their net expenditure as a monthly rebate, which may be credited to the card account or paid to the cardholder separately.

BRIEF DESCRIPTION OF THE DRAWINGS

Various features of the technology will become more apparent to those skilled in the art from a study of the Detailed Description in conjunction with the drawings. Embodiments of the technology are illustrated by way of example and not limitation in the drawings, in which like references may indicate similar elements.

FIG. 1 depicts a flow diagram of a process for manually converting an earned reward into cryptocurrency, as would conventionally occur.

FIG. 2 depicts a flow diagram of a process for investing in a cryptocurrency on behalf of a cardholder.

FIG. 17 depicts an example of a cardholder ledger that may be maintained by a cryptocurrency rewards platform.

Figure 3:
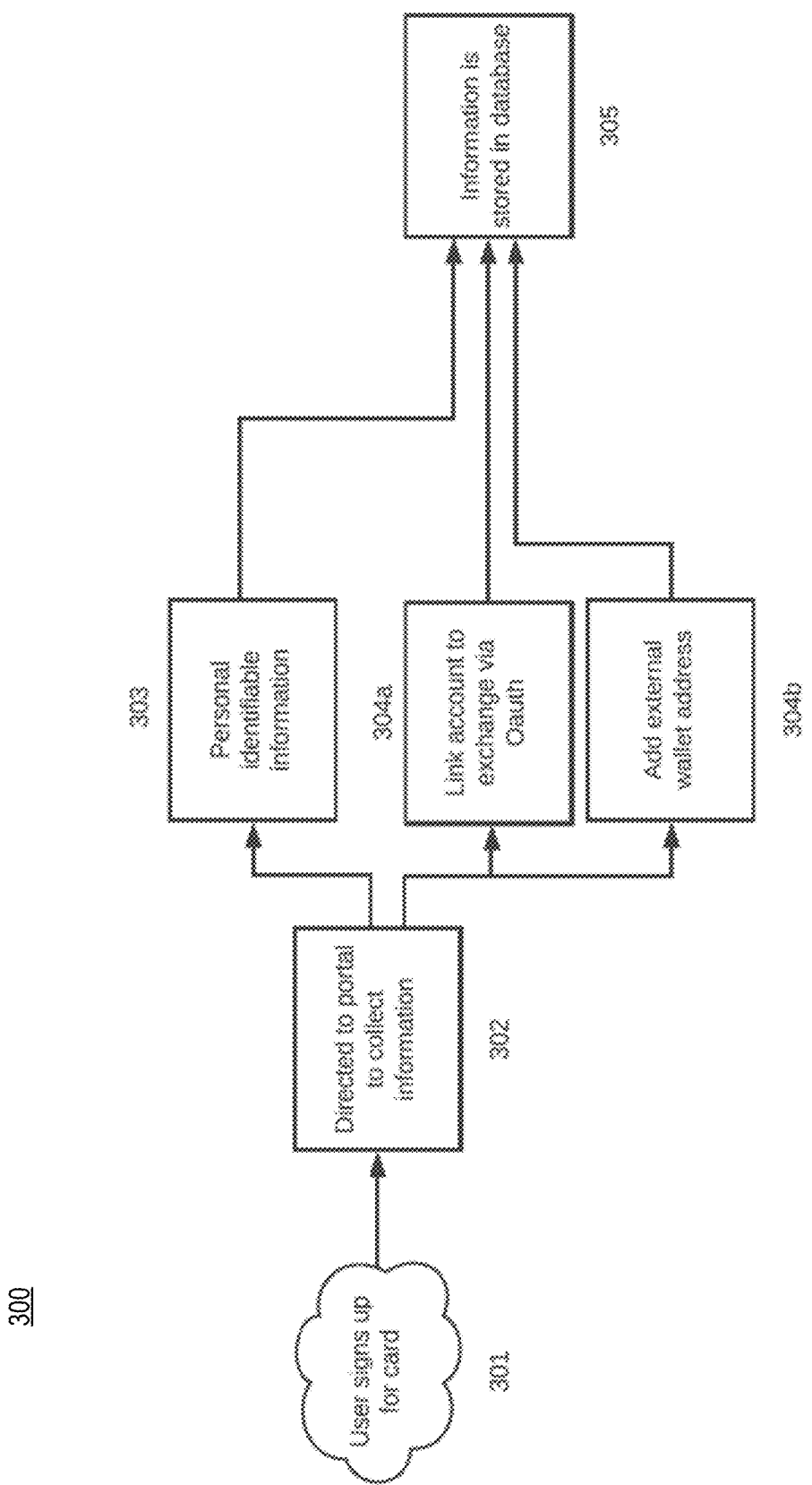
FIG. 3 depicts a flow diagram of a process for creating an account for individual who signs up for a specialized payment card.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

With the rise in popularity of cryptocurrencies, many individuals have begun investing in them. A recent survey conducted by the Global Blockchain Business Council estimates that while only 5% of the US population currency own Bitcoin, nearly 21% of the US population are considering investing in it soon. Tokenized real-world assets and digitally-native tokens have similarly grown in popularity. The term "tokenized real-world asset," as used herein, refers to a real-world asset that is represented as a digital token on a distributed ledger such as a blockchain. The term "digitally-native token," as used herein, refers to a digital token that represents a digital good. One example of a digitally-native token is a non-fungible token for a virtual cat (also referred to as a "cryptokitty"). Cryptocurrencies, tokenized real-world assets, and digitally-native tokens rely on distributed ledgers and, therefore, may be plagued by similar issues.

Two issues confront many current and soon-to-be investors in cryptocurrencies: (1) unfamiliarity with the digital assets and associated purchasing processes; and (2) their high-risk nature. Introduced here, therefore, are cryptocurrency rewards platforms (also referred to as "rewards platforms" or "platforms") able to simplify the process for acquiring cryptocurrencies by issuing cryptocurrency as a reward for transactions completed using a specialized payment card. Alternatively, the platforms may issue cryptocurrency based on the total sum of rewards earned, as determined by criteria set by a program. As further discussed below, the platforms may also issue cryptocurrency based on metrics regarding the use of a financial product. For example, cryptocurrency could be issued by a platform as a reward for keeping a certain amount of fiat currency in a bank account.

The term "specialized payment card," as used herein, may refer to a payment card having particular technology (e.g., hardware, firmware, or software) for facilitating secure transactions that are rewarded with cryptocurrency, or simply a payment card having special branding (e.g., for the cryptocurrency reward platform). The specialized payment card may allow cardholders to invest in cryptocurrencies without fees, without risking personal savings, and without dedicating significant time to the investment process. Instead, a platform can automatically facilitate, manage, and promote cryptocurrency investments/acquisitions on behalf of cardholders through a program similar to a loyalty program. Note that, in some embodiments, a management service associated with the platform may charge a fee (e.g., a monthly fee, annual fee, or transaction fee) for the specialized payment card, activities (e.g., blockchain-based transactions) that must be performed to deliver cryptocurrency, etc. Additionally or alternatively, the management service may award cryptocurrency at a higher price than its acquisition price to earn a spread.

The technology described herein generally pertains to new computer-implemented techniques for rewarding cardholders with a cryptocurrency rebate on payment card transactions. In order to issue cryptocurrency to a cardholder as a reward for completing transactions with a specialized payment card, connections may need to be established between five different entities: (1) a cryptocurrency rewards platform; (2) a financial institution; (3) a cryptocurrency exchange; (4) a payment processor; and (5) a digital wallet. The financial institution may be the issuing bank (i.e., the bank responsible for issuing the specialized payment card) or the acquiring bank (i.e., the bank responsible for receiving payment on behalf of a merchant). As further described below, the digital wallet (or simply "wallet") may be associated with the cardholder or the platform. When the wallet is hosted by an exchange (i.e., rather than the platform), the wallet may be referred to as an "account" with the exchange.

Embodiments may be described with reference to particular cryptocurrencies (e.g., Bitcoin) for the purpose of illustration. However, those skilled in the art will recognize that these features are equally applicable to other cryptocurrencies (e.g., Ethereum, Ripple, or a propriety digital currency) and other financial instruments, such as tokenized real-world assets and digitally-native tokens. Accordingly, unless contrary to possibility, the features described herein could be employed to facilitate the disbursement of tokenized real-world assets and/or digitally-native tokens in addition to, or instead of, cryptocurrency.

Similarly, embodiments may be described in the context of cardholders who earn rewards by completing transactions involving specialized payment cards. As further discussed below, however, a platform could be used by an individual who is not a cardholder to buy, sell, or transfer cryptocurrency. For instance, the platform may allow customers of a partnering financial institution, such as a bank, to invest in cryptocurrency using fiat currency managed by the partnering financial institution. Accordingly, unless the context clearly requires otherwise, the features described herein are equally applicable to cardholders, customers, and other individuals able to interface with the platform.

The technology can be embodied using special-purpose hardware (e.g., circuitry), programmable circuitry appropriately programmed with software and/or firmware, or a combination of special-purpose hardware and programmable circuitry. Accordingly, embodiments may include a machine-readable medium having instructions that may be used to program an electronic device to perform a process for examining data related to transactions completed using a specialized payment card, establishing an appropriate reward amount in fiat currency, converting the appropriate reward amount into at least one cryptocurrency, distributing the at least one cryptocurrency into at least one wallet associated with a cardholder, etc. The transaction data may be provided by a financial institution, such as a bank, or a payment processor.

Terminology

References in this description to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to"). The terms "connected," "coupled," or any variant thereof is intended to include any connection or coupling between two or more elements, either direct or indirect. The coupling/connection can be physical, logical, or a combination thereof. For example, devices may be electrically or communicatively coupled to one another despite not sharing a physical connection.

The term "based on" is also to be construed in an inclusive sense rather than an exclusive or exhaustive sense. Thus, unless otherwise noted, the term "based on" is intended to mean "based at least in part on."

When used in reference to a list of multiple items, the word "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

Technology Overview

Initially, a prospective cardholder will complete a registration process in order to sign up for a specialized payment card associated with a cryptocurrency rewards platform.

During the registration process, the prospective cardholder (also referred to as a "customer" or "user") will input personal information needed to fulfill delivery of any rewards earned by using the specialized payment card. Generally, the prospective cardholder is prompted to provide two pieces of information: (1) a wallet or an account with which to receive rewards; and (2) the type of rewards preferred by the prospective cardholder. Other information may also be necessary. For example, the prospective cardholder may be prompted to specify the preferred length of the reward cycle, personal identifying information ("PII"), etc. As another example, the prospective cardholder may be prompted to provide information needed to verify her identify, the validity of any documents, etc. This verification information may be crucial to fulfilling the Anti-Money Laundering (AML) and Know Your Customer (KYC) requirements imposed by the federal government of the United States. All of the information provided by the cardholder during the registration process can be recorded by the platform in a database.

In some embodiments, each cardholder links her account with the platform to her account on an exchange in order to receive cryptocurrency rewards in the exchange-hosted account. This can occur through open authorization ("OAuth") or a similar authentication process. OAuth is an open-standard authorization protocol that can be used to provide the cryptocurrency rewards platform with secure designated access to the exchange-hosted account. OAuth does not share password data, so the platform will not have access to credentials associated with access exchange-hosted accounts. Instead, OAuth relies on authorization tokens to prove identity.

In other embodiments, each cardholder provides her wallet address (also referred to as an "external wallet address") to the platform. This may be done for each reward option selected by a cardholder. For example, a cardholder may provide a first wallet address associated with a first cryptocurrency, a second wallet address associated with a second cryptocurrency, etc. Moreover, each cardholder may select which type(s) of rewards to receive. In some embodiments, cardholders are permitted to update these selections. For example, a cardholder may be allowed to select a new reward option periodically (e.g., following a predetermined number of billing cycles). Alternatively, the cardholder may be allowed to select a new reward option at any time.

When a cardholder completes a purchase using a specialized payment card, she will receive a rebate (also referred to as a "reward") in cryptocurrency. The bank responsible for issuing the specialized payment card, however, will not necessarily provide the cryptocurrency reward. Instead, the cryptocurrency rewards platform is responsible for disbursing the cryptocurrency reward to the cardholder's wallet. In some embodiments, the bank reimburses the platform with fiat currency. In such embodiments, the platform can then manage/oversee conversion of the fiat currency into cryptocurrency, as well as delivery of the cryptocurrency into a wallet associated with the cardholder.

The cryptocurrency rewards platform may automatically disburse cryptocurrency rewards to the cardholder based on a file known as the "rewards file," The rewards file can be generated by the platform or a financial institution, such as a card issuer or a bank, using transaction data related to transactions completed by cardholders. Generally, the transaction data is provided by one or more merchant banks and the rewards file is generated using established criteria to determine which transactions are eligible for rewards. The term "merchant bank," as used herein, refers to a bank responsible for receiving payment on behalf of a merchant. The platform may generate the rewards file itself using the transaction data based on a set of criteria. In some embodiments the set of criteria is provided by an administrator responsible for managing the platform, while in other embodiments the set of criteria is derived by the platform (e.g., based on an analysis of structure and/or content of the transaction data). Generally, cardholders are grouped into different cycles so that a rewards file will include a subset of all active accounts associated with cardholders.

In some embodiments, the cryptocurrency rewards platform is aware of how much cash rewards have been earned by each cardholder. For example, the platform may discover the amount of cash rewards earned by a given cardholder based on data acquired from the issuing bank, the merchant bank(s), and/or the payment processor. In such embodiments, the platform may be responsible for converting the cash rewards into whichever reward(s) the cardholder chose during the registration process. Alternatively, the platform may simply be informed of the value of reward(s) to be disbursed to the cardholder. Normally, some calculations will have to be performed by the cryptocurrency rewards platform, the financial institution, and/or the payment processor to determine the value of rewards due to each cardholder. For example, the platform may need to calculate a predetermined percentage of the value of all transactions in order to establish the rewards owed. Thus, the platform may be responsible for calculating the rewards owed by examining the transaction data of its cardholders or converting cash rewards into cryptocurrency rewards.

After receiving or generating the rewards file, the cryptocurrency rewards platform may normalize the data to determine the amount of rewards earned by each cardholder during the previous period. Then, the cryptocurrency rewards platform can save this information to the individual cardholder accounts. The previous period (also referred to as a "cycle," "statement period," or "billing period") could be any length of time. Thus, the previous period could be 15-25 days, 25-35 days, 45-60 days, etc. As an example, the cryptocurrency rewards platform may determine, based on an analysis of a rewards file, that a cardholder earned ten dollars' worth of rewards for the previous cycle. Thereafter, the cryptocurrency rewards platform will locate the account associated with the cardholder in the database and then update the amount of rewards owed to reflect the new balance.

In some embodiments, a partnering financial institution and/or a payment processor shares rewards data with the cryptocurrency rewards platform on a periodic basis. For example, the partnering financial institution or payment processor may provide the rewards data to the cryptocurrency rewards platform on a daily basis, weekly basis, monthly basis, etc. In other embodiments, the partnering financial institution or payment processor shares rewards data with the cryptocurrency rewards platform on a continual basis. For example, the partnering financial institution or payment processor may push this data to the cryptocurrency rewards platform whenever there is an update available (e.g., in the form of a new rewards file or as individual transaction data). In this situation, the cryptocurrency rewards platform will still normalize the data provided to it in order to determine the amount of rewards earned by each cardholder during the period as dictated by the rewards file, and then the cryptocurrency rewards platform will record that data to each cardholder's account.

As further described below, the cryptocurrency rewards platform may facilitate communication with the financial institution or the payment processor through the use of an application programming interface (API), bulk data interface, etc. In some embodiments, the cryptocurrency rewards platform also shares information with the financial institution or the payment process. One example of such information is the value of cryptocurrency investments made by the cryptocurrency rewards platform.

The cryptocurrency rewards platform can independently distribute cryptocurrency rewards to cardholders based on the updated data associated with each cardholder. The cryptocurrency rewards platform can achieve this by disbursing the cryptocurrency from the corporate treasury (also referred to as a "corporate account") that holds enough cryptocurrency to distribute rewards to the cardholders. The corporate treasury is the sum of all funds owned by the platform. In some embodiments, at least a portion of those funds exist in the form of digital currency held across multiple wallets. Thus, the corporate treasury may include one or more corporate wallets (also referred to as "treasury wallets") hosted on one or more exchanges. For example, if a cardholder earned ten dollars' worth of rewards and selected Bitcoin as her chosen reward, the cryptocurrency rewards platform may distribute ten dollars' worth of Bitcoin from a corporate treasury holding Bitcoin to a wallet associated with the cardholder. The wallets associated with cardholders may be hosted by an exchange, a third-party entity, or the cryptocurrency rewards platform. Thus, the cryptocurrency rewards platform may be responsible for creating hosted or non-hosted wallets for cardholders.

The wallet(s) corresponding to the corporate treasury can be held on an exchange or through a wallet custodied by the platform itself. In most cases, the corporate treasury will be held across multiple wallets, whether hosted on exchanges or custodied by the platform. As hacking is a prominent concern in the cryptocurrency industry and an inherent risk of wallets, the risk of funds in the corporate treasury being stolen can be mitigated by spreading those funds across different wallets. Moreover, spreading the funds across multiple wallets hosted on different exchanged may allow for better operational efficiency since exchanges can offer different tools/support through their APIs, have different downtimes (e.g., for technical work), and have different fee structures.

The cryptocurrency rewards platform can continuously track the cryptocurrencies (and the amount and value of those cryptocurrencies) held across the wallet(s) belonging to the platform by making API calls to the appropriate exchange(s) or blockchain(s), or by examining the ledger data stored by the platform for each wallet. If necessary, the cryptocurrency rewards platform can complete purchases, sales, or transfers of cryptocurrency funds across different wallets in order to rebalance the corporate wallet. This process, which is referred to as "wallet balance management," serves to lessen the risk that the corporate wallet will be accessed in an unauthorized manner, as well as increase operational efficiency of the platform. In some embodiments, the cryptocurrency rewards platform determines the difference in balance across multiple wallets after identifying the balance of each wallet and then remedies the imbalance through automatic transactions in which wallets with higher balances transfer funds to wallets with lower balances until the balances are roughly equal. In other embodiments, the cryptocurrency rewards platform submits requests to complete purchases and/or sales of cryptocurrency until the balances of the wallets under consideration is roughly equal (e.g., as determined through API calls to the corresponding exchanges). It may also be the case that, in some situations, having unequal balances actually lessens risk to the corporate wallet. Accordingly, the cryptocurrency rewards platform could be designed to automatically distribute (or redistribute) cryptocurrency across multiple wallets in an unequal manner. For example, if the majority of cardholders link an account hosted by a given exchange, it may be more cost and resource effective to hold a larger balance in the corporate wallet hosted by the given exchange.

The cryptocurrency rewards platform can disburse cryptocurrency rewards to the wallets of cardholders based on a number of factors, including but not limited to the number/value of rewards earned, the preferred reward type, the address of the wallet, and the due date for disbursing the rewards. For instance, if a cardholder is owed ten dollars' worth of rewards and has chosen Bitcoin as the preferred reward type, the cryptocurrency rewards platform may disburse ten dollars' worth of Bitcoin (as calculated based on the present market price, with or without a spread) from its corporate wallet to the wallet or account on record for that cardholder.

Similarly, the cryptocurrency rewards platform can determine when to disburse cryptocurrency rewards to the wallets of cardholders based on a number of factors, including but are not limited to the disbursement schedule requested by the cardholder, the processing resources available to the platform, and the number/value of rewards amount. For instance, the cryptocurrency rewards platform could choose to disburse all rewards owed to cardholders on the same day the rewards file is received, generated, or processed. The platform could also choose to deliver the rewards the day after the rewards file is received, or one cardholder at a time until all rewards due have been delivered. In some embodiments, the platform disburses cryptocurrency rewards on a roughly periodic basis. For example, the platform may disburse cryptocurrency rewards at a predetermined frequency (e.g., every 3 days, 7 days, 15 days, or 30 days) to cardholders who completed at least one transaction during the previous interval of time. In other embodiments, the platform discuses cryptocurrency rewards on a non-periodic basis. For example, the platform may disburse a cryptocurrency reward to a cardholder in response to determining that the cardholder completed a predetermined number of transactions (e.g., 5, 10, or 25 transactions). As another example, the platform may disburse a cryptocurrency reward to a cardholder in response to determining that the total value of the cryptocurrency reward exceeds a predetermined value (e.g., 1, 5, or 10 dollars' worth of cryptocurrency).

In some embodiments, the cryptocurrency rewards platform determines which corporate wallet to use to disburse funds to a cardholder based on where the cardholder's wallet is held. If the wallet of the cardholder is held on the same exchange as a corporate wallet of the platform and transactions between these wallets are feeless because they occur off the blockchain, the platform can choose to disburse funds from that corporate wallet to all cardholders with a wallet hosted on that exchange. In order to perform this function, the platform queries where the wallets of the cardholders with earned rewards are held, and then the platform checks to see if there is any overlap between these exchanges and the exchange(s) on which the corporate wallets are held. An exchange that includes a corporate wallet and at least one wallet belonging to a cardholder may be referred to as a "shared exchange." The platform can check what fee, if any, each shared exchange imposes to transfer funds between wallets hosted on that exchange through API calls, and then the platform can determine which corporate wallet(s) to use to disburse funds.

In other embodiments, the cryptocurrency rewards platform determines which corporate wallet to use to disburse funds to a cardholder based on the fees to purchase/transfer cryptocurrency imposed by each exchange that hosts a corporate wallet. The platform can accomplish this by requesting a quote for purchasing more cryptocurrency or transferring a specific amount of cryptocurrency through an API call. For example, if the platform discovers that the fee for purchasing more cryptocurrency is 0.2% of volume on a first exchange and 0.1% of volume on a second exchange, the platform may choose to disburse cryptocurrency from the second exchange. As another example, if the platform discovers that the fee for transferring cryptocurrency is $0.03 on a first exchange and $0.01 on a second exchange, the platform may choose to disburse cryptocurrency from the second exchange.

The cryptocurrency rewards platform can also use API calls to discover the price of cryptocurrency at different exchanges and use that information to determine where to purchase cryptocurrency. For instance, if the platform discovers that the asking price for Bitcoin is $10,050 on a first exchange and $10,000 on a second exchange, the platform may opt to purchase Bitcoin at the second exchange since it's the better value. Similarly, the platform may opt to transfer Bitcoin to cardholders from a corporate wallet hosted on the second exchange since it's cheaper to replenish.

In some embodiments, the platform automatically designates a set level (also referred to as a "set balance" or "lower balance") for each corporate wallet, or for the corporate treasury as a whole. The set level can be calculated to ensure that all payout obligations for each reward period can be met. For instance, if the platform expects to disburse ten thousand dollars' worth of Bitcoin in the next day, the platform will ensure that the balance of the corporate wallet(s) holding Bitcoin equals at least $10,000. The expected payout can be determined based on a number of different factors, including but not limited to the payout for the preceding reward period, account growth, seasonal fluctuations in spending, etc. When the balance in the corporate wallet(s) drops below the set level, whether due to disbursements or volatility in price, cryptocurrency can be automatically acquired to reach the set level. The platform may also be configured to sell cryptocurrency if the balance of the corporate wallet (or the corporate treasury as a whole) exceeds an upper balance. These buying and selling actions can be performed immediately upon determining that the amount of available funds no longer exceeds the set level. Alternatively, these buying and selling actions can be performed periodically (e.g., on a daily or weekly basis) or in response to determining that the difference between the available funds and the set level exceeds a specified amount.

By disbursing cryptocurrency from a corporate wallet with a set balance (i.e., a balance that is not calculated based on the transactions completed by cardholders) to non-custodial wallets, the platform may be able to avoid implicating money transmission issues. This operating flow allows the platform to avoid converting currencies on behalf of cardholders and acting as a custodian for cardholder funds.

In some embodiments, the cryptocurrency rewards platform facilitates the reward process by purchasing and distributing cryptocurrency based on the rewards earned by cardholders by connecting to one or more exchanges. In such embodiments, the corporate treasury may only be used to hold cryptocurrency temporarily since the platform purchases cryptocurrency based on the actual rewards due to cardholders (i.e., rather than on the anticipated payout) and then immediately disburses it. The corporate treasury may not even be necessary if the exchange(s) allow for distribution to other wallets immediately after a purchase order is executed. After the cryptocurrency has been purchased, the platform will disburse the cryptocurrency to the cardholder(s). This may happen immediately or following the expiration of a set period of time. For example, if a cardholder earns ten dollars' worth of Bitcoin, the platform can purchase ten dollars' worth of Bitcoin and then immediately distribute it to the wallet belonging to the cardholder. This technique allows the platform to purchase and distribute cryptocurrency in a very short amount of time while minimizing any foreign currency risk (also referred to as "FX risk") associated with holding the cryptocurrency. It is also possible that the platform may purchase the cryptocurrency on behalf of the cardholder, thereby assigning any FX risk to the cardholder.

The platform may also help customers of a bank convert earned rewards (e.g., in the form of cash, loyalty points, etc.) into cryptocurrency. These customers do not have to be cardholders. Instead, a customer may simply provide information related to her wallet to the bank or the platform. For example, a customer may choose to convert an earned reward into cryptocurrency through a web portal provided by the bank or the platform. The platform could then convert the value of the earned reward into the cryptocurrency and then purchase it from an exchange. After purchasing the cryptocurrency, the platform can distribute it by transferring the cryptocurrency to a wallet belonging to the customer. In another embodiment, the platform could distribute the cryptocurrency by transferring it from one or more corporate wallets.

In order to purchase cryptocurrency to be disbursed as a reward, the platform may add a payment method to an exchange. One technique for accomplishing this involves providing information related to a bank account associated with the platform to the exchange as a payment method via the exchange's API. Such action would allow the platform to automatically remit funds from its bank account to an account on the exchange. The exchange account could belong to the platform or another entity, such as the exchange itself or the card issuer responsible for issuing the specialized payment cards.

The platform may also help customers of the bank earn cryptocurrency based on use of another financial product (e.g., a bank account such as a checking account or savings account). For example, the platform could distribute cryptocurrency to customers in lieu of the interest on funds held in savings account. In this scenario, the process is largely similar to disbursing cryptocurrency as a reward for using a specialized payment card, however, the platform will receive data from the bank holding the funds on behalf of the customer instead of a rewards file. This data will include the information needed to determine the interest payment due to the customer, and the platform will disburse the appropriate amount of cryptocurrency to the customer based on this information.

Operators of loyalty programs may become liable if rewards are not delivered within a certain amount of time. Therefore, it may be critical to verify that cryptocurrency has actually been delivered to cardholders. When cryptocurrency is disbursed to a cardholder from a corporate wallet, the platform may verify that the cryptocurrency has been transferred through an API call to the exchange responsible for completing the transfer. Similarly, when cryptocurrency is delivered off-chain, the platform may verify delivery through an API call to the exchange responsible for completing the transfer. The term "off-chain delivery" refers to a transaction that does not occur on the blockchain. Normally, off-chain deliveries are only performed by exchanges that custody all funds.

Alternatively, cryptocurrency may be sent from a corporate wallet to the cardholder's wallet on a blockchain. In such scenarios, the platform may assume the transaction has been successfully completed after a certain number of confirmations on the blockchain (also referred to as the "confirmation threshold"). The platform can use API calls to the blockchain, with or without using a third-party service, to verify the number of confirmations.

Capital Gains Considerations

Cryptocurrency transactions are currently subject to capital gains tax, which makes it imperative that the cost basis is recorded to ensure that gains/losses can be accurately calculated. Accordingly, when cryptocurrency is purchased, the platform may record all of the pertinent information in its database(s). This information may include the date and time (also referred to as the "timestamp") at which the cryptocurrency was purchased, the amount of cryptocurrency purchased, the type of cryptocurrency purchased, and the present value of the cryptocurrency. The platform can accomplish this by requesting the information from the exchange on which the purchase was completed through its API.

When cryptocurrency is disbursed to a cardholder, the platform can record the timestamp of the transaction, the amount of cryptocurrency disbursed, the type of cryptocurrency disbursed, and the present the value of the cryptocurrency. For example, the platform may request the current market price of the cryptocurrency and the timestamp of the transaction via an API call to the exchange responsible for facilitating the transfer. Additionally, the platform may establish the amount of cryptocurrency being disbursed and the type of cryptocurrency being disbursed based on changed in its ledger. This information is not only critical to helping the platform calculate its gains/losses on each transaction but may also be used by the cardholder to calculate a cost basis.

The platform may record this information regardless of how long the cryptocurrency is in its possession. For example, the platform may purchase cryptocurrency on behalf of a cardholder for immediate distribution. In some embodiments, this cryptocurrency may not have been earned through use of the specialized payment card, but the platform may still record all pertinent information so that the cardholder can determine a cost basis for her cryptocurrency.

Benefits of Technology

The technologies described herein provide several benefits over conventional loyalty programs. For example, the platform enables cardholders to readily invest in cryptocurrencies without being familiar with the corresponding digital assets, purchasing processes, etc. Additionally, the platform provides a low-risk opportunity to invest in cryptocurrencies in comparison to traditional techniques like purchasing directly from an exchange.

In addition to providing value to cardholders, the platform offers value to the financial institution, payment network, and payment processor responsible for issuing and supporting the specialized payment cards. For example, by managing the rewards process, the platform may allow the financial institution, payment network, and payment processor to profit from offering a cryptocurrency-backed payment card without any of the risks associated with handling cryptocurrency.

The technologies also provide several benefits unique to loyalty programs that offer currency as rewards. As noted above, one benefit is that at least some of the techniques for purchasing, selling, or transferring cryptocurrency described herein are unlikely to implicate money transmission regulations. This frees the platform from the extensive and expensive obligations necessary to obtain money transmitter licenses. The cost of pursuing registration and licensure nationwide can cost upwards of $750,000, while the registration and licensure process for each state will normally take 3-9 months. These licenses also require that the entity requesting licensure employ a chief compliance officer, which could cost over $250,000 in total annual compensation.

Overview of Selected Embodiments

FIG. 1 depicts a flow diagram of a process 100 for manually converting an earned reward into cryptocurrency, as would conventionally occur. Initially, a cardholder completes a transaction using a payment card (step 101). Thereafter, the cardholder will reach a reward redemption threshold (step 102). In some instances, the reward redemption threshold is defined by a monetary amount (e.g., $1, $10, $25, $1,000, $2,000, etc.). Generally, the cardholder will need to complete multiple transactions to reach the monetary amount over several weeks, months, etc. In other instances, the reward redemption threshold is defined by a time interval (e.g., a week, month, or year). In such embodiments, the earned reward may vary based on the number of transactions completed during the time interval.

After the reward redemption threshold is reached, an earned reward is provided to the cardholder. Generally, the earned reward will be in the form of cash. Accordingly, the cardholder may transfer the cash reward to a bank account (step 103), such as a checking account or a savings account. To convert the cash reward into cryptocurrency, the cardholder has to manually transfer the cash reward from the bank account to an exchange (step 104), and then purchase cryptocurrency using the cash reward (step 105).

By manually completing the process 100, the cardholder will own a single cryptocurrency. However, manually-performed processes for investing in cryptocurrencies (e.g., with earned rewards for using payment cards) are ineffective, cumbersome, and undesirable. For example, if a cardholder wishes to invest her earned reward into Bitcoin, there is a strong chance she would be unable to do so because of restrictions imposed by her bank, such as only being able to apply the earned rewards as statement credit. In the cases where the cardholder is able to do so, she would have to transfer the earned reward into her bank account and then into an account on an exchange before finally completing the cryptocurrency purchase. Alternatively, if the cardholder is permitted to purchase the cryptocurrency directly using a payment card, there is a high likelihood the transaction would be subject to significant fees from the bank and/or the exchange.

To acquire multiple cryptocurrencies, meanwhile, the cardholder would have to complete at least part of this time-consuming process multiple times. For example, funds may be deposited into an account belonging to an individual on an exchange, but if the individual wishes to purchase multiple cryptocurrencies, then the individual may need to manually complete multiple transactions (e.g., a separate transaction for each cryptocurrency in which funds are invested). This is undesirable for the aforementioned reasons. Plus, each time this process is completed, the risk of sensitive information being acquired by an unauthorized entity (e.g., a hacker) increases. Examples of sensitive information include payment information (e.g., payment card number, card verification value (CVV), cardholder name, cardholder address, etc.), bank information (e.g., account name, account number, etc.), and exchange information (e.g., wallet credentials, public and private keys, etc.).

Introduced here, therefore, are computer programs and associated computer-implemented techniques for offering cryptocurrency as a reward to individuals based on transactions involving payment cards. The technology allows cardholders to automatically acquire cryptocurrencies without being required to manually complete time-consuming processes or being exposed to the risks associated with cryptocurrencies. These risks include financial risks (e.g., due to the volatility of cryptocurrency) and security risks (e.g., due to the digital nature of cryptocurrencies).

FIG. 2 depicts a flow diagram of a process 200 for investing in a cryptocurrency on behalf of a cardholder. As further described below, a cryptocurrency rewards platform (or simply "platform") may be designed to automatically invest in a cryptocurrency based on transactions completed by the cardholder using a specialized payment card without any input from the cardholder. Through the process 200, the cardholder can earn cryptocurrency without going through the cumbersome process of purchasing the cryptocurrency herself (e.g., with an earned cash reward for using a payment card). The process 200 can save the cardholder amble time and money (e.g., by avoiding various fees), as well as reduce the risk of unauthorized accesses of the sensitive information needed to invest in cryptocurrencies.

Initially, a cardholder completes a transaction using a specialized payment card (step 201). The reward earned by completing the transaction can determined by a payment processor, a financial institution such as a bank, or the platform itself, and this information can be delivered the platform in the form of a data file (or simply "file"). The file can be delivered to the platform in the form of an email, fax, or a comma-separated values (CSV) file retrieved by the platform (step 202). Generally, the file includes a summary of all transactions that occurred during the previous cycle. Once the cryptocurrency rewards platform receives the file, it can normalize the data into a standard format and then identify the cardholders who are owed rewards. Moreover, the platform can, for each cardholder, determine the amount owed, the type of reward chosen, and the address for its delivery. This information will be loaded into the disbursement queue (step 203). Once the platform determines it is time to distribute rewards, it can automatically distribute the rewards from a corporate wallet to the cardholders' wallets (step 204). In some embodiments, the platform verifies delivery of the rewards after the rewards have been sent (step 205).

The automated process 200 of FIG. 2 improves upon the manual process 100 of FIG. 1 in several key respects. First, it completely eliminates the need to manually perform steps 103, 104, and 105. This not only saves the cardholder from having to oversee the entire process herself, but also minimizes or eliminates the potential fees that could be incurred in each of these steps. Second, it allows for automated investment which eliminates the need for the cardholder to "time the market." By continually repeating the process, cardholders benefit from lower investment risk through dollar-cost averaging. Cardholders who complete transactions using specialized payment cards provided/serviced by the platform need only complete a transaction in order to receive cryptocurrency.

Specialized Payment Card Registration

FIG. 3 depicts a flow diagram of a process 300 for creating an account for individual who signs up for a specialized payment card. Initially, an individual will sign up for the specialized payment card (step 301). For example, the individual may access an interface associated with a cryptocurrency rewards platform to indicate that she is interested in becoming a cardholder. Thereafter, the individual can provide information to the platform through the interface (step 302). Normally, the individual accesses the interface through a web browser. However, the interface could be accessible via a desktop application, mobile application, or over-the-top (OTT) application. The information requested by the platform may be necessary to calculate and/or distribute rewards. The information can include a wallet address or an exchange account at which to receive rewards disbursed by the platform, the type of reward preferred by the individual, and personal identifying information ("PII") (step 303).

Some exchanges permit cardholders to link accounts directly via OAuth (step 304a) so that rewards can be deposited directly into their accounts. Additionally or alternatively, cardholders may input wallet addresses (step 304b) so that rewards can be transferred directly into their wallets. For example, a reward may be transferred to a wallet when a reward threshold, as established by the platform, is met. In some cases a cardholder will only connect one wallet, while in other cases she may connect multiple wallets through different methods. These wallet addresses may be referred to as "internal wallet addresses" if the wallet is hosted by the platform and "external wallet addresses" if the wallet is hosted by an exchange or as a separate hot or cold wallet. All authentication data, such as OAuth tokens, may be stored by the platform in a database.

During the process 300, the individual may also specify which type(s) of rewards she would like to receive. For example, the individual may indicate that she would like to receive Bitcoin, Ethereum, Ripple, or any combination thereof. This information can be stored as an attribute of the individual (now a "cardholder") in an encrypted form in the database, so that the platform can distribute rewards accordingly when the queue is ready to process.

Cryptocurrency Disbursement Queuing

Figure 4:
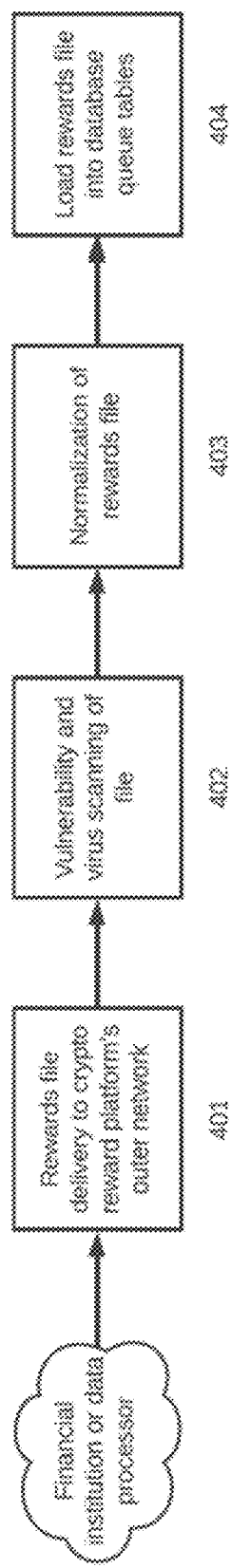
FIG. 4 depicts a flow diagram of a process for acquiring data from a source, such as a financial institution or a payment processor.

As noted above, the platform may be responsible for disbursing cryptocurrency as a reward for using a specialized payment card to complete transactions. To distribute the proper amounts of cryptocurrency, the platform needs to establish the reward owed to each cardholder. Generally, the reward is calculated based on data acquired from a source external to the platform. FIG. 4 depicts a flow diagram of a process 400 for acquiring data from a source, such as a financial institution or a payment processor. The platform can acquire data in many different ways, including (i) a file being uploaded to the platform; (ii) a file being retrieved/downloaded by the platform; (iii) a file attached to an email; and (iv) a file provided via an API. In some embodiments, the platform is able to interface with a third party, such as Plaid®, who retrieves and/or processes data acquired from another source. For example, the platform may interface with the third party through an API, and the third party may transfer data to the platform via the API.

Generally, the platform is designed to pull files as its preferred method, using a bastion host setup designed to reduce third-party access to the platform's networks, databases, etc. (step 401). Once the bastion host receives a file, it will scan the file for viruses and other vulnerabilities (step 402). The platform (and, more specifically, its processing cluster) can then normalize the data into a standard format that can be readily examined (step 403). This normalized format may vary depending on the type of individual (e.g., cardholder versus non-cardholder), type of bank, frequency at which rewards data is received, type of cryptocurrency payout, etc.

After the data has been normalized, the platform will load it into the disbursement queue. The platform can use a variety of different techniques for queuing. For example, the platform may load the data into a database table or a messaging service such as RabbitMQ (step 404). The process 400 is designed to queue rewards that need to be disbursed into the database, thereby allowing the platform to process disbursements at the platform's discretion. The platform may decide to process disbursements daily, weekly, monthly, or at some other interval. The platform may be configured to pay out one cryptocurrency at a different frequency than another cryptocurrency. For example, the platform could process disbursements of Bitcoin on a weekly basis and disbursements of Ethereum on a bi-weekly basis.

Queuing the disbursements provides flexibility, so the platform can easily increase or decrease the number of disbursements as necessary. For instance, if the platform needed to disburse 10,000 allotments of cryptocurrency as rewards, it could queue these rewards so that they are processed sequentially so as to work within the confines of the processing capacity available to the platform. Moreover, the platform could decide to prioritize certain disbursements over others based on factors such as the block time for a specific cryptocurrency, whether the disbursement will occur on a shared exchange, etc. Queuing disbursements enables the platform to implement these prioritizations.

Corporate Wallets

Figure 5:
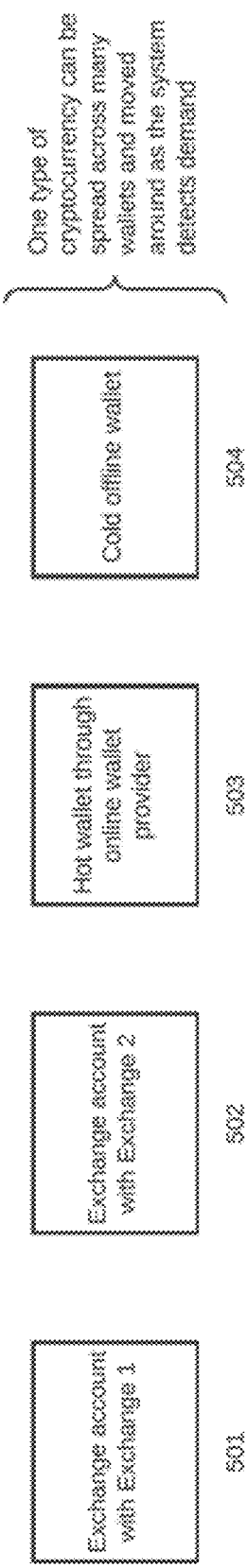
FIG. 5 illustrates how a corporate wallet can be comprised of online external wallets (also referred to as "hot external wallets"), offline external wallets (also referred to as "cold external wallets"), and/or corporate accounts with various exchanges.

Cryptocurrency can be disbursed from one or more corporate wallets held by the cryptocurrency rewards platform. FIG. 5 illustrates how a corporate wallet can be comprised of online external wallets (also referred to as "hot external wallets"), offline external wallets (also referred to as "cold external wallets"), and/or corporate accounts with various exchanges. Cryptocurrency can be strategically held in these wallets based on variables such as anticipated future payouts, cryptocurrency prices, current quantity held, network fees, availability, or any combination thereof. For example, if a disproportionate number of cardholders have accounts on a specific exchange, the corporate wallet(s) hosted on that exchange may contain more cryptocurrency than corporate wallets hosted on other exchanges.

Various scripts can be used to continuously analyze the current distribution of cryptocurrency across multiple corporate wallets and then move cryptocurrency between the corporate wallets based on, for example, the factors specified above. Moreover, the platform may notify an administrator if it believes that a certain amount of cryptocurrency should be moved offline into a cold external wallet. This can be manually accomplished through an interface for cold external wallet management accessible to the administrator. By maintaining cryptocurrency across multiple wallets, the cryptocurrency rewards platform can mitigate the susceptibility of its funds being stolen or lost in some other manner.

Corporate Wallet Balance Management

The back-end architecture of the cryptocurrency rewards platform can track the balances of multiple corporate wallets corresponding to one or more cryptocurrencies. In some embodiments, the platform may decide to set a threshold for the amount of cryptocurrency held in each corporate wallet. To accomplish this, the platform may perform a "top up" method to ensure that each wallet has a specific balance. The platform may automatically buy, sell, or transfer cryptocurrency into the wallets as necessary to maintain the specific balance. The threshold could remain static or change continuously.

Scripts can be used to manage these corporate wallets, as well as periodically ensure that the proper balance for each corporate wallet is maintained. The actual balance of each corporate wallet could vary based on several factors, including but not limited to (i) the type of cryptocurrency; (ii) the frequency of payouts; (iii) whether the corporate wallet is an exchange wallet/account; (iv) the type of wallet; (v) wallet payout trends; (vi) cryptocurrency volatility; and/or (vii) perceived susceptibility to hacking. Each "top up" transaction/transfer can be recorded in a ledger that tracks all purchases, sales, and transfers involving the corporate wallets.

Figure 6:
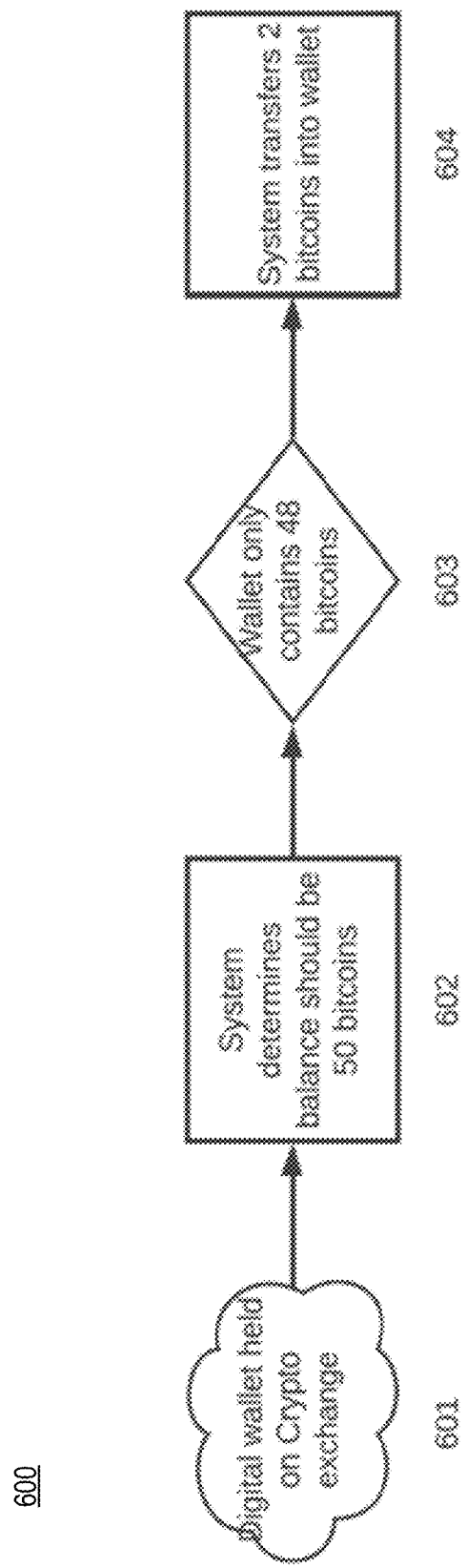
FIG. 6 depicts a flow diagram of a process for managing the balance of cryptocurrency across the corporate wallets handled by a cryptocurrency rewards platform.

Due to the volatility of cryptocurrency and the consistent disbursements to cardholders, the value/amount of each cryptocurrency in the corporate wallets may fluctuate on a continuous basis. In order to fulfill future disbursements, as well as mitigate the risk (and increase the benefit) of cryptocurrency volatility, the platform may refill and/or rebalance the corporate wallets on a continuous basis. FIG. 6 depicts a flow diagram of a process 600 for managing the balance of cryptocurrency across the corporate wallets handled by a cryptocurrency rewards platform. As shown in FIG. 6, the platform may be responsible for managing corporate wallets hosted on one or more exchanges (step 601). In some embodiments, a predefined threshold is set for the balance of each corporate wallet (step 602). When the balance of a corporate wallet falls below its predefined threshold (step 603), the platform may refill the wallet as necessary. In the embodiment illustrated in FIG. 6, the platform transfers two Bitcoin into the corporate wallet to ensure that the predefined threshold is met (step 604). In other embodiments, the platform may complete a purchase of two Bitcoin that are subsequently transferred into the corporate wallet.

Figure 7:
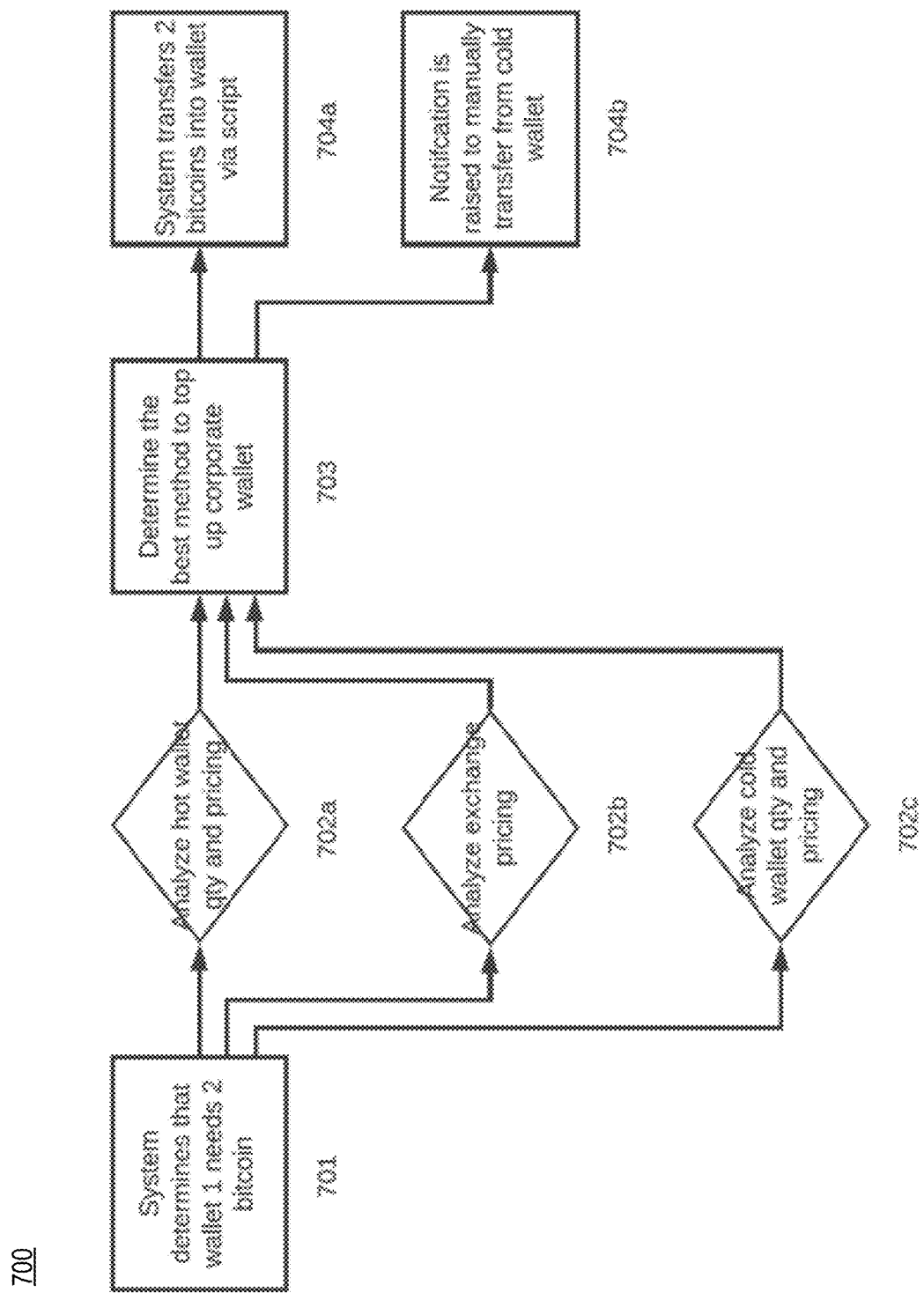
FIG. 7 depicts a flow diagram of a process for managing the balance of the corporate wallets as necessary.

There are several techniques for maintaining cryptocurrency levels across various wallets, and each technique has its own advances and disadvantages. For instance, if the price of Bitcoin is below the ten-day average, it may be best to purchase additional Bitcoin when a "top up" is needed. Conversely, if the price of Bitcoin is above the ten-day average, it may be best to transfer Bitcoin from another corporate wallet. If it is determined that a corporate wallet needs rebalancing (e.g., so that the balance is higher or lower than its current amount), the platform may determine the best technique for doing so. FIG. 7 depicts a flow diagram of a process 700 for managing the balance of the corporate wallets as necessary.

For example, if the platform determines that a corporate wallet ("Wallet 1") needs two Bitcoin (step 701), the platform can check the balances of Bitcoin across other corporate wallets responsible for holding Bitcoin (steps 702a, 702c). Additionally, the platform may execute scripts that cause API calls to be made to the exchange(s) on which the corporate wallets are hosted (or some other sources) to determine the currency price of Bitcoin on each exchange (step 702b). The platform can then decide how to rebalance/refill the corporate wallets (step 703). The decision may be based on a number of factors, including price, availability, current inventory, balances in other corporate wallets, etc. The platform may use these factors to determine whether it should (i) do nothing; (ii) transfer cryptocurrency from an existing wallet; (iii) purchase cryptocurrency from an exchange; (iv) sell cryptocurrency on an exchange; (v) make a request to an administrator to load cryptocurrency from a cold wallet; or (vi) any combination thereof. In the embodiment shown in FIG. 7, two Bitcoin are added into Wallet 1 from a hot wallet (step 704a) or a cold wallet (step 704b).

In some embodiments, the decisions made in these steps are centered around providing rewards at the least expensive cost. In other embodiments, the decisions are centered around mitigating certain types of risk, including FX risk. These decisions could be centered around multiple factors. For example, the platform may have a sum of cryptocurrency in an offline wallet, but the prince of cryptocurrency may be at a minimum (e.g., a global/absolute minimum or a local minimum within a predetermined interval of time) so it may be more cost efficient to purchase the cryptocurrency from an exchange. As another example, the platform may choose to keep all corporate wallets at a balance of zero (or near zero) to minimize the risk of holding cryptocurrency.

Figure 8:
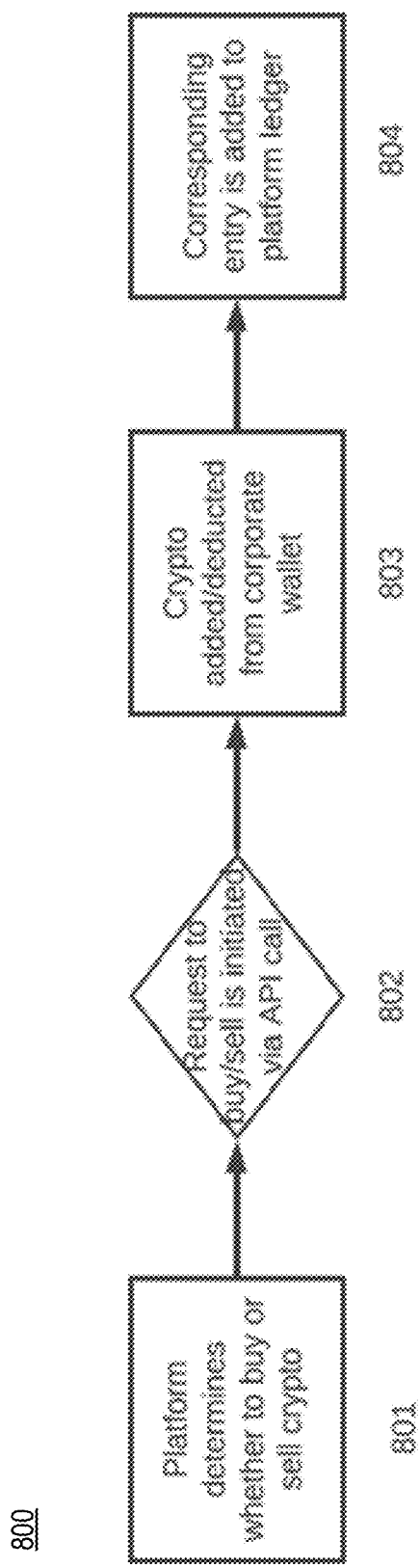
FIG. 8 depicts a flow diagram of a process for buying/selling cryptocurrency on an exchange.

FIG. 8 depicts a flow diagram of a process 800 for buying/selling cryptocurrency on an exchange. Initially, the cryptocurrency rewards platform will decide whether to purchase or sell cryptocurrency through an exchange to which the platform is communicatively connected (step 801). If the platform decides to purchase/sell cryptocurrency though the exchange, the platform can initiate a request by executing a script that makes an API call to the exchange (step 802). In this scenario, the API call is representative of an order to buy/sell cryptocurrency. This process 800 may vary based on the exchange and the type of order. For instance, some exchanges allow simple buy orders, while other exchanges have a more complicated purchasing process similar to a stock exchange order. After the order is processed, the cryptocurrency can be added to, or deducted from, one or more corporate wallets (step 803). The platform may also add an entry to a ledger upon completion of this process 800 so that the purchase/sale of cryptocurrency can be tracked (step 804).

Figure 9:
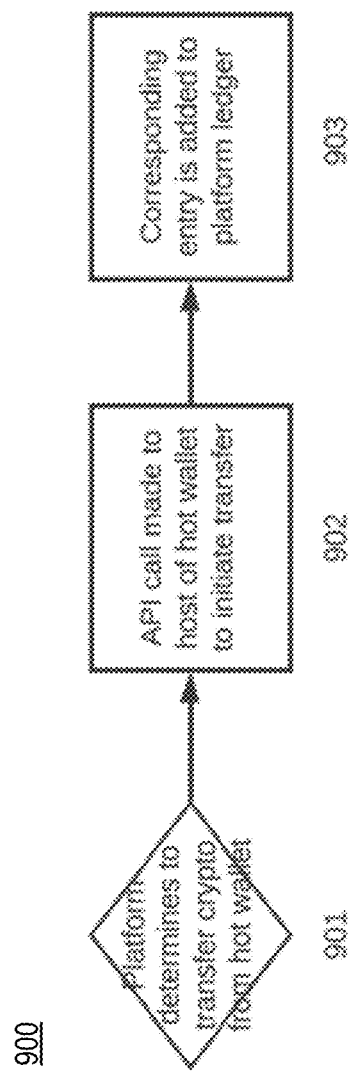
FIG. 9 depicts a flow diagram of a process for transferring cryptocurrency from a hot wallet to another corporate wallet.

FIG. 9 depicts a flow diagram of a process 900 for transferring cryptocurrency from a hot wallet to another corporate wallet. If the platform decides to transfer cryptocurrency from a hot wallet (step 901), the platform can execute a script that makes the appropriate API call(s) to the exchange or site on which the hot wallet is hosted to initiate the transfer from the hot wallet (also referred to as a "source wallet") to a destination wallet (step 902). The platform may add an entry to a ledger after the transfer has been completed (step 903).

Figure 10:
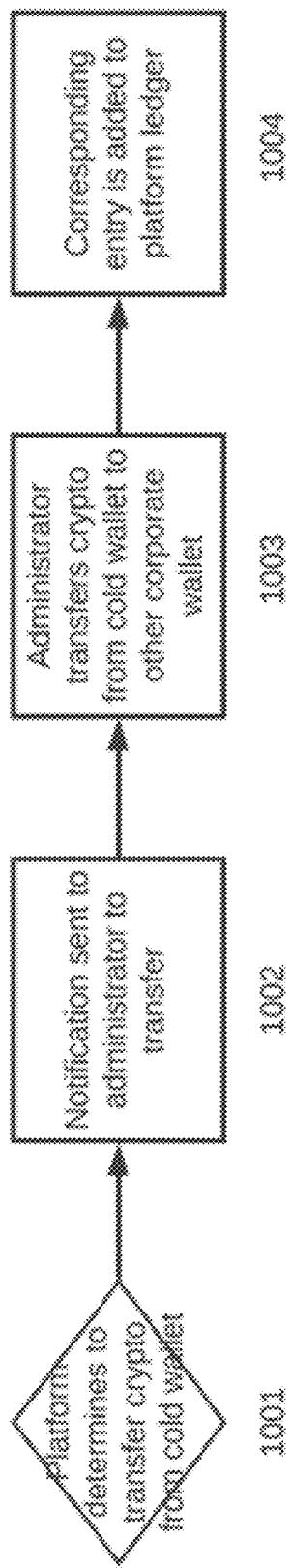
FIG. 10 depicts a flow diagram of a process for transferring cryptocurrency from a cold wallet to another corporate wallet.

Sometimes the platform will determine that an offline wallet (also referred to as a "cold wallet") is the best solution for filing a hot wallet or another cold wallet (step 1001). FIG. 10 depicts a flow diagram of a process 1000 for transferring cryptocurrency from a cold wallet to another corporate wallet. In this process 1000, a notification may be sent to an administrator that specifies cryptocurrency should be transferred from a cold wallet into a hot wallet or another cold wallet (step 1002). Generally, the administrator will manually perform the transfer (step 1003). Then, an entry can be added to a ledger to track the transaction inside an administrative interface for cold wallets (step 1004). This action may be performed manually (e.g., by the administrator) or automatically (e.g., by the platform on behalf of the administrator).

Figure 11:
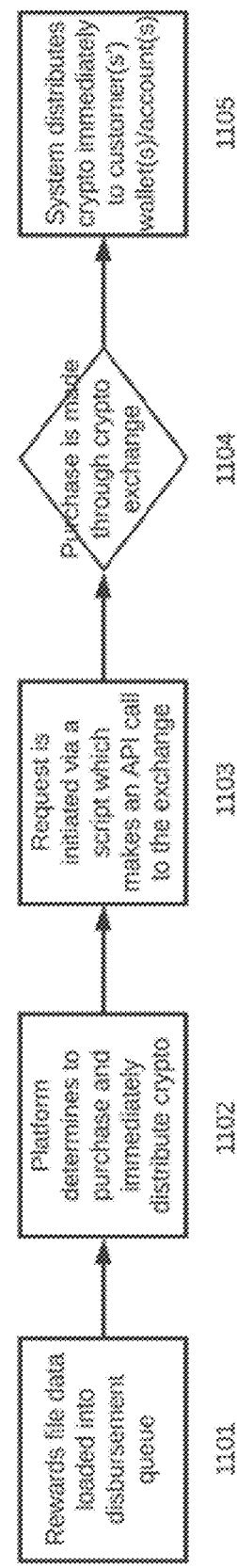
FIG. 11 depicts a flow diagram of a process for purchasing cryptocurrency for immediate distribution.

FIG. 11 depicts a flow diagram of a process 1100 for purchasing cryptocurrency for immediate distribution. In this process 1100, the platform would effectively purchase the cryptocurrency needed for a transaction while processing the transaction in the disbursement queue. After data from the rewards file is loaded into the disbursement queue (step 1101), the platform can determine how to process each request for disbursement. In some instances, the platform may determine that a given request is best achieved through an immediate purchase and distribution during processing (step 1102). To accomplish this, the platform can initiate a request by executing a script that makes an API call to an exchange to place a buy order in the amount of cryptocurrency to be disbursed (step 1103). After the buy order has been executed (step 1104), the cryptocurrency can be immediately disbursed to the corresponding cardholder (step 1105). For example, if a cardholder is due ten dollars' worth of Bitcoin, a buy order may be placed for Bitcoin in the amount of $10. As soon as the cryptocurrency is purchase, it may be distributed to the cardholder. In this process 1100, a corporate wallet may be used to temporarily hold the cryptocurrency while it is purchased from the exchange in order to facilitate delivery to the cardholder. Generally, these immediate disbursements of cryptocurrency take seconds to complete. The platform may record each of these transactions (e.g., by noting when the cryptocurrency was purchased and disbursed).

In some embodiments, multiple cardholders' rewards may be summed and purchased in a single order. Thus, the platform may batch multiple rewards together and then perform the process 1100 of FIG. 11. In such embodiments, after the cryptocurrency has been purchased, the platform could disburse the appropriate portion of the cryptocurrency to each cardholder immediately after acquisition, or the platform could disburse the appropriate portion of the cryptocurrency to each cardholder at specific time intervals.

By purchasing the exact amount of rewards owed to cardholders and then immediately disbursing it, the platform is able to lessen risk. Due to the volatility of cryptocurrency, FX risk could greatly increase the operational expenses of a cryptocurrency rewards platform. In fact, due to the low profit margins in the payment card industry, it is possible that FX risk could make the expense of delivering rewards so high as to put the cryptocurrency rewards platform out of business altogether. Because of this high risk, the process 1100 for immediately purchasing and disbursing cryptocurrency may have significant value.

Most exchanges charge a fee for processing buy orders and sell orders. Accordingly, when the platform initiates a transaction, the platform can choose whether to deduct that fee from the reward owed to a cardholder or pay the fee itself by adding the amount to the buy order.

Cryptocurrency Disbursements

The cryptocurrency rewards platform can be designed to distribute cryptocurrency as a reward for using a specialized payment card to complete transactions. To accomplish this, the platform can support financial institutions (e.g., banks) and/or merchant partners (e.g., exchanges) with their own rulesets, thereby allowing licensing or distribution of the platform by these financial institutions and/or merchant partners. Moreover, this arrangement may enable the platform to support multiple specialized payment cards. The platform (and its underlying architecture) can define variables on a per-bank basis, including but not limited to (i) import methods; (ii) reward distribution frequency; (iii) corporate wallet(s); and/or (iv) distribution rules.

Figure 12:
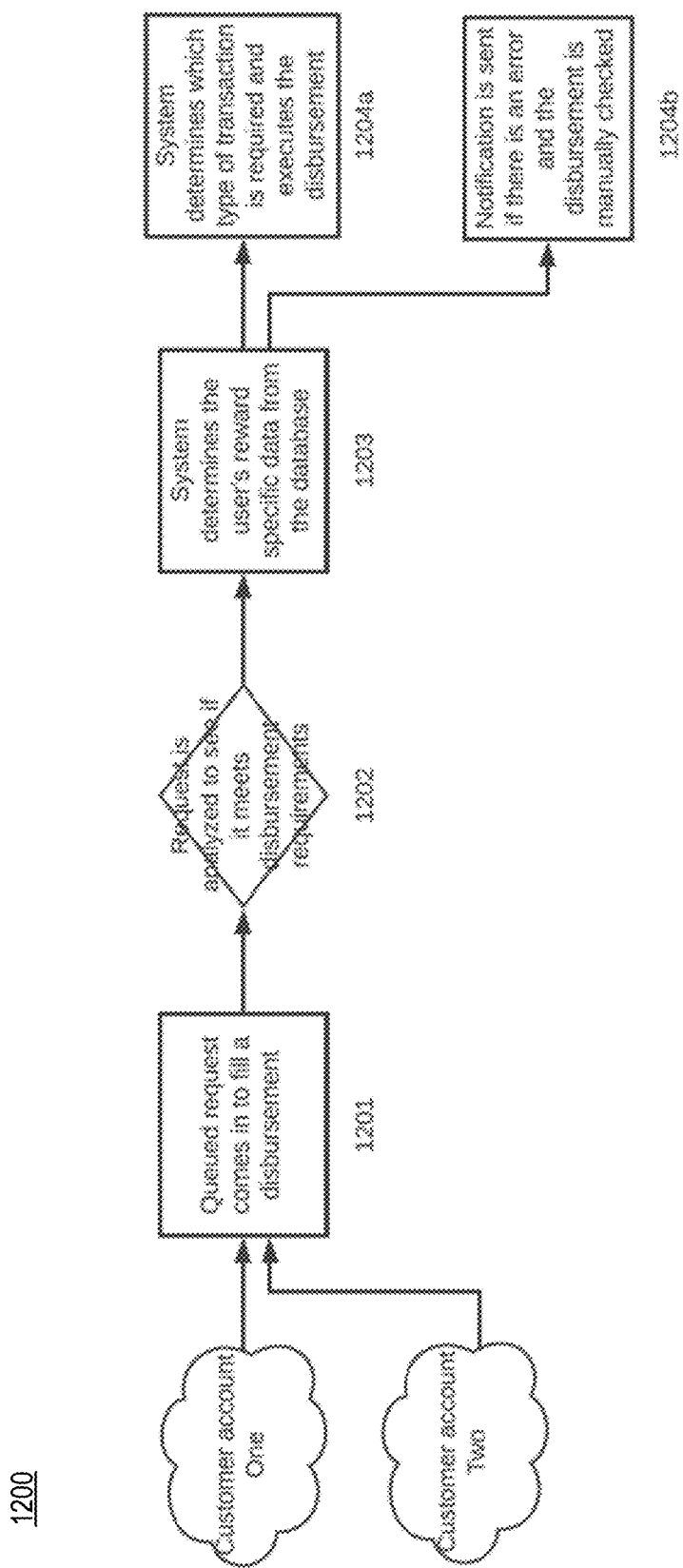
FIG. 12 depicts a flow diagram of a process for distributing cryptocurrency as rewards.

FIG. 12 depicts a flow diagram of a process 1200 for distributing cryptocurrency as rewards. Reward data can be queued into the platform as discussed above (step 1201). Then, the platform can determine when to distribute the rewards based on a number of factors, including but not limited to (i) the due date of a reward; (ii) the price of cryptocurrency; (iii) availability of cryptocurrency on hand in corporate wallets; (iv) distribution frequency as requested by a cardholder; (v) the average block time for a specific cryptocurrency; (vi) the current network fees for a specific cryptocurrency; and/or (vii) the type of cryptocurrency (step 1202).

After the platform determines that a reward should be distributed for a particular cardholder, the platform can query the database to determine the reward amount, type of distribution, and preferred reward type (e.g., the type of cryptocurrency) (step 1203). The platform can then decide which type of distribution method or corporate wallet should be used to fulfill the reward (step 1204a). If the platform cannot make this decision based on, for example, the factors listed above, the platform will notify an administrator and place the queued reward on hold for manual approval (step 1204b).

If the platform selects a valid corporate wallet, it may first determine the type of transaction that is required to fulfill the disbursement. If an exchange transaction is required, the platform can determine whether it is an on-blockchain transaction or an off-blockchain transaction. Typically, most off-blockchain transactions occur via an API service offered by the exchange, and verification of disbursement is nearly instantaneous. If it is an on-blockchain transaction to an external wallet, it is typically wallet to wallet and will require verification steps that are used to validate the transaction has been completed.

Figure 13:
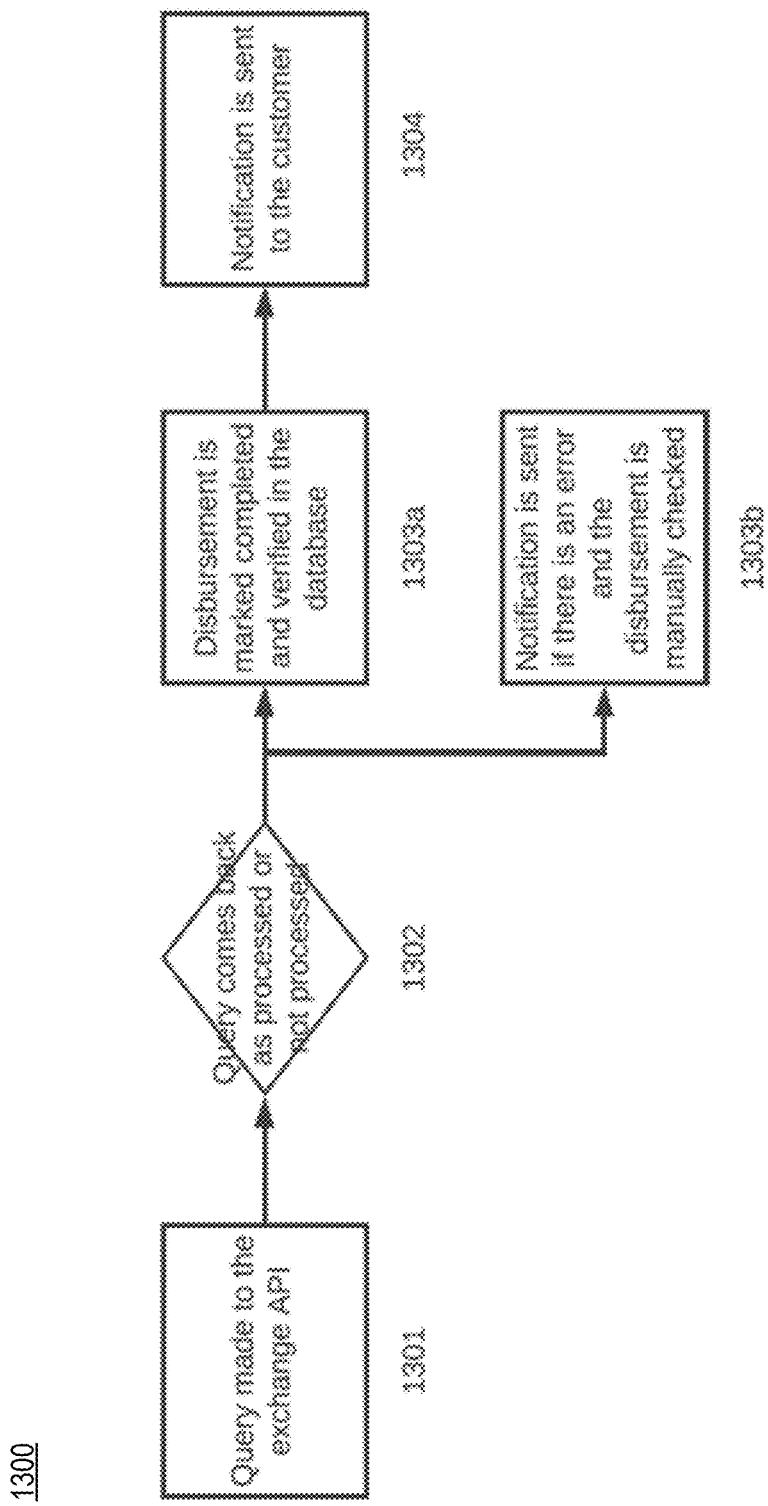
FIG. 13 depicts a flow diagram of a process for facilitating a transaction through an exchange.

FIG. 13 depicts a flow diagram of a process 1300 for facilitating a transaction through an exchange. In this process 1300, the platform executes a script that queries the exchange's API and submits a transfer request (step 1301). In other embodiments, an API call is made to purchase the cryptocurrency and then transfer the cryptocurrency to a cardholder's wallet. This request can be submitted account to account, bypassing the blockchain so that the cryptocurrency can be delivered immediately. The API response typically verifies that the transaction was successful, and the distribution is considered completed (step 1302). The transaction may be noted by the platform in a ledger (step 1303a), and the platform may send a notification to the cardholder via email, push notification, text, or some other messaging system that specifies the reward has been distributed (step 1304). If there is an error with the transaction, a notification may be sent to an administrator of the platform for manual review (step 1303b).

Figure 14:
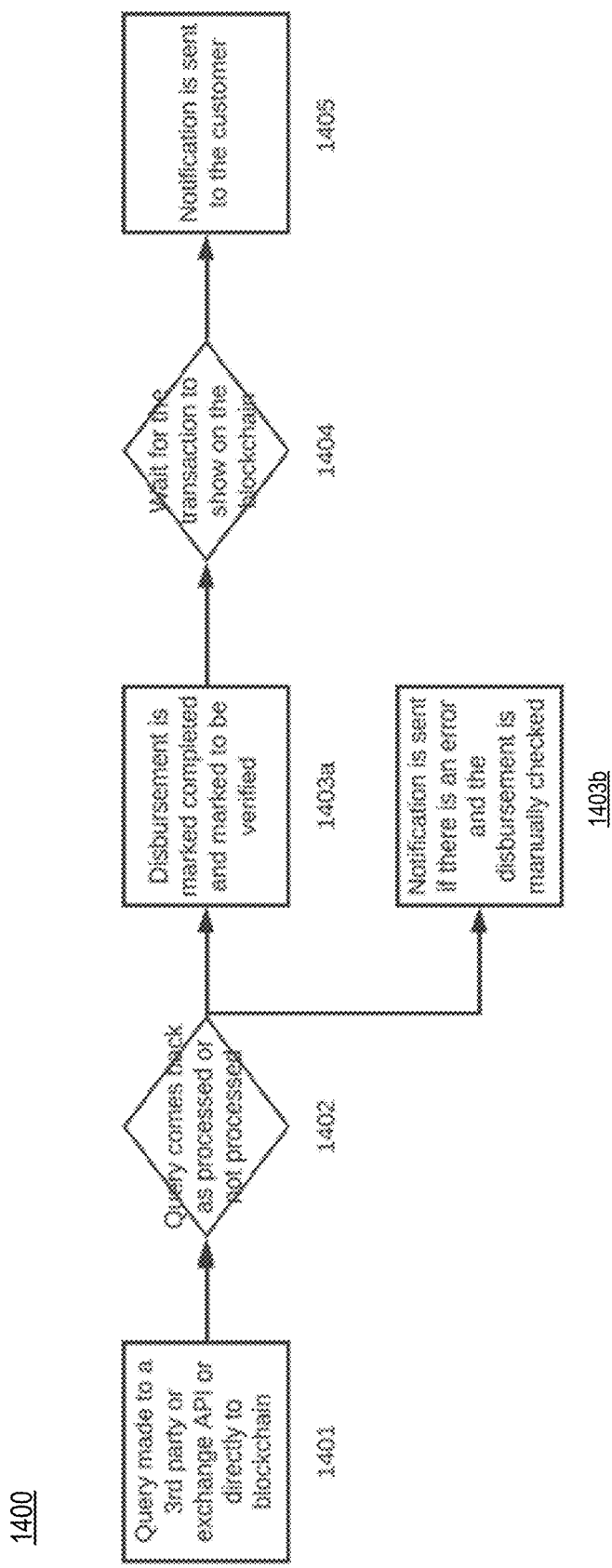
FIG. 14 depicts a flow diagram of a process for completing an on-blockchain transaction.

FIG. 14 depicts a flow diagram of a process 1400 for completing an on-blockchain transaction. In this scenario, a wallet-to-wallet transaction may be created. Depending on the platform's and/or licensing entity's operating methodology, the platform may add an amount equal to the fees of the transaction in order to cover the cost of the transaction. Alternatively, the transaction fees may be deducted from the reward. The platform can also decide how and when to disburse cryptocurrency based on the fees associated with transferring cryptocurrency. For example, it may be beneficial to send cryptocurrency in a later block in order to reduce the fee paid. The wallet-to-wallet transaction could be created through a third-party service, through an API supported by an exchange, or sent directly to the blockchain. While the API call itself may vary depending on the provider, the methodology is the same.

In some embodiments, an API call is made to initiate a transfer of cryptocurrency from a corporate wallet into a cardholder's wallet (also referred to as the "destination wallet") (step 1401). In other embodiments, an API call is made to purchase the cryptocurrency and then transfer it to the destination wallet. In response to the API call, the query will return as either processed or not processed (step 1402). When the query returns as processed, the disbursement is marked as completed and needing verification of delivery (step 1403a). The platform may not consider the transaction as complete until it has received confirmations on the blockchain that the request has succeeded (step 1404). The platform can receive confirmation through a third-party service or a direct call to the blockchains. After the transaction has been confirmed, the platform may notify the cardholder that the transaction has been completed (step 1405). If there is an error with the transaction, a notification may be sent to an administrator of the platform for manual review (step 1403b).

Figure 15:
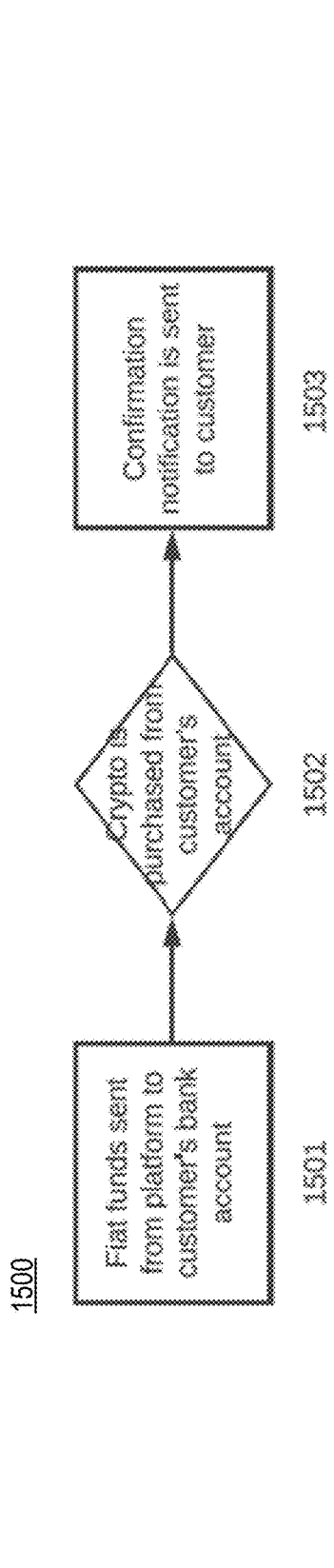
FIG. 15 depicts a flow diagram of a process for facilitating a manual purchase of cryptocurrency following the automatic disbursement of fiat funds.

In another embodiment, the platform purchases cryptocurrency for the cardholder from an account associated with the cardholder. The account may be managed by an exchange or a financial institution. If the account is managed by an exchange, the platform can request access to buy/sell cryptocurrency through the exchange from the account. Once access has been granted, the platform can automatically purchase cryptocurrency for the cardholder in the amount of owed as a reward. Alternatively, the cardholder may be permitted to purchase the cryptocurrency herself with fiat funds provided by the platform. The fiat funds used for the purchase could be provided through a transfer to a bank account that is associated with the cardholder and connected to the exchange. FIG. 15 depicts a flow diagram of a process 1500 for facilitating a manual purchase of cryptocurrency following the automatic disbursement of fiat funds.

Assuming a cardholder earns ten dollars' worth of rewards in Bitcoin, the platform could transfer $10 from its bank account to a bank account of the cardholder that is connected to the exchange (step 1501). Generally, the bank account of the cardholder is connected to the exchange as part of a registration process. For example, when the cardholder creates an account for the exchange, she may be prompted to link the bank account to her account. After the funds have been received by the cardholder, the platform may purchase ten dollars' worth of Bitcoin from the cardholder's account with the exchange (step 1502). Thereafter, the platform may send a notification that indicates the transaction was successful to the cardholder (step 1503). The notification may be in the form of an email message, text message, push notification, etc. In another embodiment, the cardholder may prefund her account and then be reimbursed by the platform for the transaction following its completion.

Cryptocurrency Disbursement Verification

A cryptocurrency rewards platform can disburse cryptocurrency in several different ways. For instance, the platform may disburse cryptocurrency from one exchange to another exchange off blockchain, or directly to external wallets through transactions on a blockchain.

Operators of loyalty programs have a legal obligation to deliver rewards in accordance with their program guidelines (also referred to as "program rules" or "program agreement"), and these operators are liable if those obligations are not met. Accordingly, verifying each disbursement of cryptocurrency may be crucial to ensuring that rewards have been properly delivered to cardholders. Since cryptocurrency can be sent on blockchain (referred to as "on-chain transactions") or off blockchain (referred to as "off-chain transactions"), the platform may be designed to perform multiple verification procedures.

The verification procedure for exchange-to-exchange, off-chain transactions are generally specific to the exchanges involved. Some exchanges will return a success code in the response to an API call for disbursement of cryptocurrency. FIG. 13 illustrates how the platform can verify cryptocurrency has been delivered when the disbursement occurs off the blockchain. Initially, the platform executes a script that makes an API call to an exchange to disburse cryptocurrency to a cardholder (step 1301). Thereafter, the platform can receive a response to the API call from the exchange that indicates whether the disbursement was successful. That is, the response will specify whether the request to disburse cryptocurrency was processed (step 1302).

If the transaction was successful, the platform can record the transaction in the ledger as a confirmation that the reward has been distributed to the cardholder (step 1303a). However, if the transaction was not successful, there are several error conditions that may indicate the reason for the failure. In such a scenario, the platform can transmit a notification to an administrator of the platform that specifies the transaction has been flagged for re-transmittal and/or manual examination (step 1303b). After the transaction has been successfully completed, the platform can communicate the outcome to the cardholder. For example, the platform may transmit a notification to the cardholder that specifies the reward was successfully converted into cryptocurrency (step 1304).

Verification of on-chain transactions can be handled differently. These transactions can be verified based on the number of confirmations that have been received on the blockchain associated with the cryptocurrency. This number is establishing by making an API call to the blockchain, either directly or through a third-party service. The number of confirmations that are used to confirm a transaction was successful is referred to as the "confirmation threshold." The confirmation threshold may be based on a number of factors, including but not limited to (i) cryptocurrency type; (ii) cryptocurrency blockchain trust; (iii) platform trust; and/or (iv) time sensitivity. Relatively few (e.g., 3, 5, or 10) confirmations are required in some cases, while large numbers (e.g., 20, 50, or 100) of confirmations are required in other cases.

Figure 16:
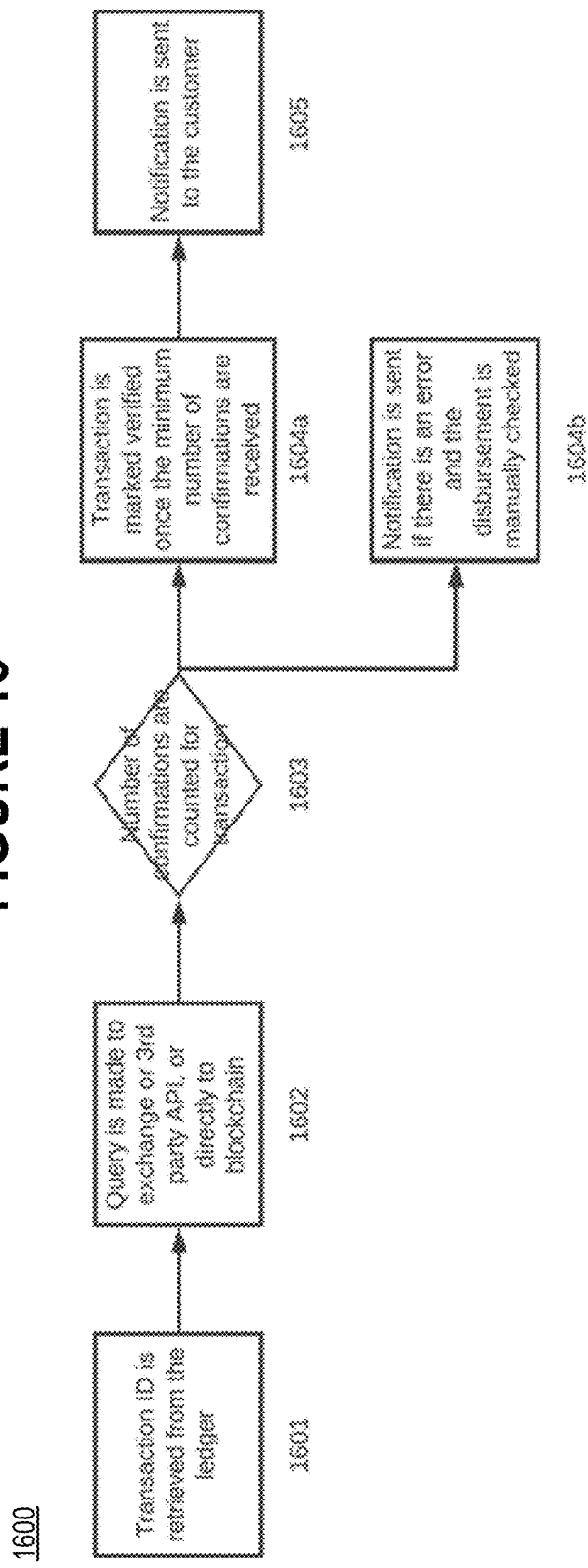
FIG. 16 depicts a flow diagram of a process for verifying on-chain transactions.

FIG. 16 depicts a flow diagram of a process 1600 for verifying on-chain transactions. Initially, the platform can obtain an identifier for a given transaction from the ledger (step 1601). Then, the platform can query the blockchain using the identifier as a reference (step 1602) to determine the number of confirmations for the given transaction (step 1603). After the confirmation threshold has been met, delivery of the cryptocurrency can be deemed verified (step 1604) and the transaction can be considered complete. In some embodiments, the platform transmits a notification to the cardholder (step 1605) indicating that the transaction has been successfully completed. If any disbursements do not meet the confirmation threshold within an interval of time dictated by the platform, the transaction may be flagged for manual examination. For example, the platform may identify any transactions that have not been verified within 6 hours, 12 hours, 24 hours, 36 hours, etc.

As noted above, these procedures for verifying cryptocurrency has been delivered to cardholders may be critically important in ensuring that the obligations of a loyalty program are met. These verification procedures ensure that the platform (or any entities licensing its services) avoid legal liability that could result in severe fines, suspensions of its services, etc. Additionally, these verification procedures allow the platform to monitor the effectiveness of its disbursements.

Cardholder Ledger

Figure 17:
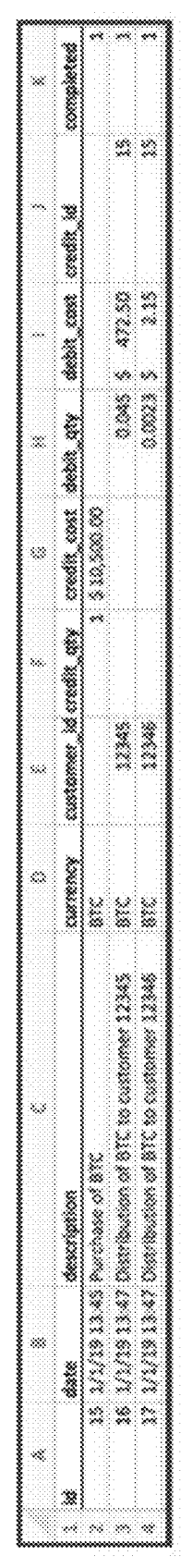

FIG. 17 depicts an example of a cardholder ledger that may be maintained by a cryptocurrency rewards platform. As noted above, the platform could be used by individuals who are not cardholders to buy, sell, or transfer cryptocurrency, so the cardholder ledger may also be referred to as a "customer ledger." The ledger may be used as an accounting ledger to track all requests for transactions that are received by the platform and all requests for transactions that are generated by the platform. This allows the platform to track a specific amount of cryptocurrency from its purchase (or when it was received) through its disbursement or sale.

Additionally, the platform may record a timestamp for each transaction that specifies the date and time at which the transaction occurred. By temporally tracking transactions, the platform can record all information needed to calculate the cost basis for cryptocurrencies for itself and cardholders. Moreover, the platform can calculate the net loss/gain for its transactions through the chosen accounting method. Assume, for example, that a cardholder receives ten dollars' worth of Bitcoin at 11 AM on Aug. 29, 2019, and the price of Bitcoin is $16,000 at that time. The platform could record this information and/or make it easily accessible to the cardholder. This function allows the platform and/or the cardholder to easily provide the necessary information to the Internal Revenue Service (IRS).

Since each transaction could potentially originate from multiple corporate wallets at any given time, the platform may track all purchases of cryptocurrencies and which corporate wallet(s) include those cryptocurrencies. The platform could also link each purchase to a distribution in order to utilize the best purchasing/distribution policies for each transaction. For example, a corporate wallet held by a first exchange ("Exchange A") may contain cryptocurrency that was purchased at a much lower price than the cryptocurrency contained in another corporate wallet held by a second exchange ("Exchange B"). Even though the cardholder may request that cryptocurrency be disbursed into a personal wallet on Exchange B, the platform may opt to send cryptocurrency from Exchange A based on the data maintained in the ledger.

Network Environment

Figure 18:
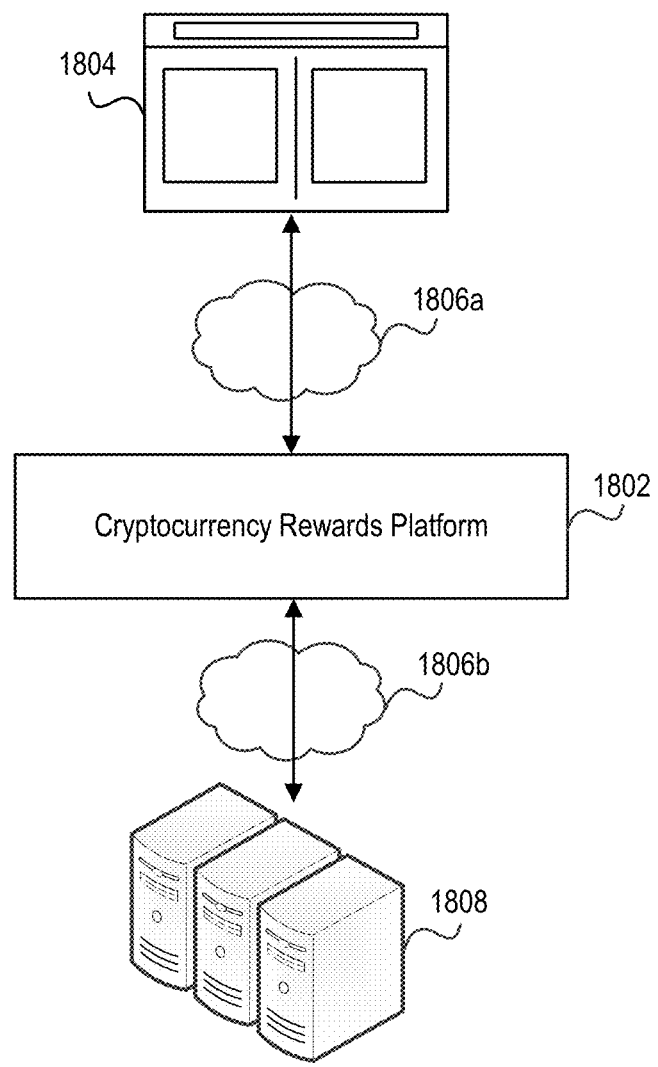
FIG. 18 illustrates a network environment that includes a cryptocurrency rewards platform.

FIG. 18 illustrates a network environment 1800 that includes a cryptocurrency rewards platform 1802 (or simply "platform"). Individuals can interface with the platform 1802 via an interface 1804. The platform 1802 may be responsible for examining transactions completed by a cardholder using a specialized payment card, identifying an appropriate cash reward based on a value of the transactions, converting the appropriate cash reward into cryptocurrency, etc. The platform 1802 may also be responsible for creating interfaces through which a cardholder can examine cryptocurrency-related information (e.g., account balance, the current value of various cryptocurrencies, recommendations regarding investment strategies), manage investment/disbursement preferences (e.g., by specifying which cryptocurrencies should be invested in, or how the cash reward should be distributed amongst multiple cryptocurrencies), manage platform preferences (e.g., login credentials), etc.

As noted above, the platform 1802 may reside in a network environment 1800. Thus, the platform 1802 may be connected to one or more networks 1806*a-b*. The network(s) 1806*a-b* can include personal area networks (PANs), local area networks (LANs), wide area networks (WANs), metropolitan area networks (MANs), cellular networks, the Internet, etc. Additionally or alternatively, the platform 1802 can be communicatively coupled to electronic device(s) over a short-range communication protocol, such as Bluetooth® or Near Field Communication (NFC).

The interface 1804 is preferably accessible via a web browser, desktop application, mobile application, or over-the-top (OTT) application. Accordingly, the interface 1804 may be viewed on a personal computer, tablet computer, personal digital assistant (PDA), mobile phone, game console, music player, wearable electronic device (e.g., a watch or fitness accessory), network-connected ("smart") electronic device, (e.g., a television or home assistant device), virtual/augmented reality system (e.g., a head-mounted display), or some other electronic device.

Some embodiments of the platform 1802 are hosted locally. That is, the cryptocurrency rewards platform 1802 may reside on the electronic device used to access the interface 1804. For example, the platform 1802 may be embodied as a mobile application executing on a mobile phone. Other embodiments of the platform 1802 are executed by a cloud computing service operated by Amazon Web Services® (AWS), Google Cloud Platform™, Microsoft Azure®, or a similar technology. In such embodiments, the platform 1802 may reside on a host computer server that is communicatively coupled to one or more content computer servers 1808. The content computer server(s) 1808 can include account information (e.g., account balance, an electronic record mapping the account to one or more wallets), user information (e.g., profiles, credentials, and card-related information such as account number, CVV, etc.), wallets, and other assets. Such information could also be stored on the host computer server.

Certain embodiments are described in the context of network-accessible interfaces. However, those skilled in the art will recognize that the interfaces need not necessarily be accessible via a network. For example, an electronic device may be configured to execute a self-contained computer program that does not require network access. Instead, the self-contained computer program may cause necessary assets (e.g., account balance, current value of various cryptocurrencies, recommended investment strategies) to be downloaded at a single point in time or on a periodic basis (e.g., weekly, daily, or hourly).

The products and services offered by the platform 1802 may be whitelisted in some instances. For example, a financial institution responsible for supporting the specialized payment card may affix their own branding to the specialized payment card, the website used to register for the specialized payment card, etc. Similarly, an exchange may be interested in whitelisting the specialized payment card in order to offer the service to their customer base. By whitelisting services performed by the platform 1802, the exchange is able to reinforce customer loyalty, strengthen their brand, and increase revenues.

Additional Implementations

There are several other techniques for achieving a similar end result (i.e., the investment of cash rewards into cryptocurrencies), though these other techniques are less efficient and offer less choice for cardholders.

In a first example, a cardholder may use a traditional payment card that is associated with a cashback reward program to manually purchase cryptocurrency on an exchange. However, this process is significantly more difficult than those describe here for the following reasons:

Many payment card companies charge high fees on cryptocurrency purchases;

Many financial institutions do not allow cryptocurrency purchases at all;

Transferring cash rewards from one account (e.g., a bank account) to another account (e.g., an exchange account) to purchase cryptocurrency is a long process that typically incurs multiples charges/fees;

Many payment cards restrict cash rewards to be applied as statement credit; and

Cardholders would be responsible for "timing the market" (i.e., cardholders would have to identify the most appropriate time to buy cryptocurrency).

In a second example, a cardholder may use a cryptocurrency-backed payment card such as TenX, Metal, or Monaco. However, each of these crypto-currency-backed payments cards reward cardholders with their own propriety cryptocurrency. These proprietary cryptocurrencies are not readily convertible into cash, and they require that cardholders choose when to invest in cryptocurrencies, which cryptocurrencies to invest in, etc. As such, holding these proprietary cryptocurrencies greatly increases risk as it does not allow cardholders to invest in the cryptocurrencies deemed to be the safest bet.

Processing System

Figure 19:
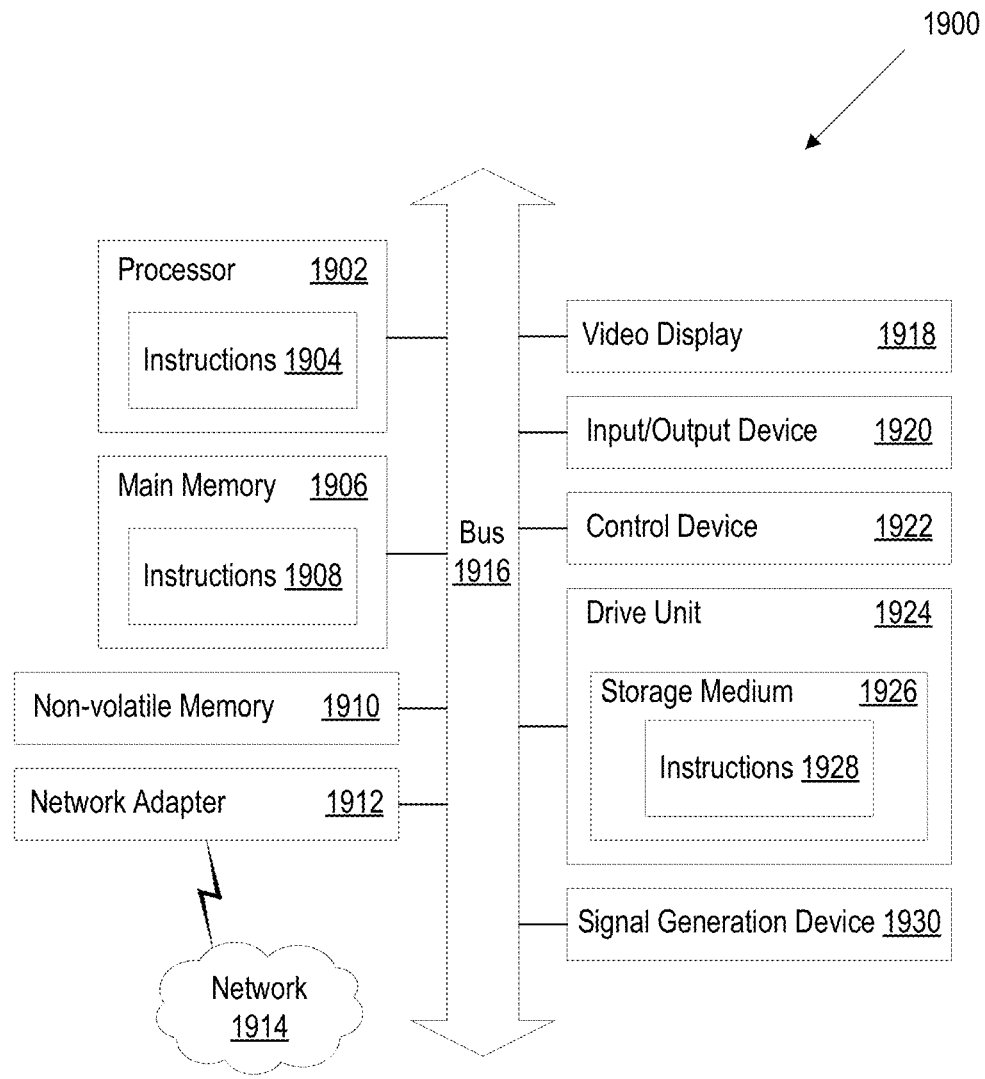
FIG. 19 is a block diagram illustrating an example of a processing system in which at least some operations described herein can be implemented.

FIG. 19 is a block diagram illustrating an example of a processing system 1900 in which at least some operations described herein can be implemented. For example, some components of the processing system 1900 may be hosted on an electronic device that includes a cryptocurrency rewards platform (e.g., cryptocurrency rewards platform 1502 of FIG. 15). As another example, some components of the processing system 1900 may be hosted on an electronic device configured to manage accounts that include cash rewards and/or cryptocurrencies.

The processing system 1900 may include one or more central processing units ("processors") 1902, main memory 1906, non-volatile memory 1910, network adapter 1912 (e.g., network interface), video display 1918, input/output devices 1920, control device 1922 (e.g., keyboard and pointing devices), drive unit 1924 including a storage medium 1926, and signal generation device 1930 that are communicatively connected to a bus 1916. The bus 1916 is illustrated as an abstraction that represents one or more physical buses and/or point-to-point connections that are connected by appropriate bridges, adapters, or controllers. The bus 1916, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processing system 1900 may share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 1900.

While the main memory 1906, non-volatile memory 1910, and storage medium 1926 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1928. The term "machine-readable medium" and "storage medium" shall also be taken to include any medium that is capable of storing, encoding, or carrying a set of instructions for execution by the processing system 1900.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 1904, 1908, 1928) set at various times in various memory and storage devices in a computing device. When read and executed by the one or more processors 1902, the instruction(s) cause the processing system 1900 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 1910, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 1912 enables the processing system 1900 to mediate data in a network 1914 with an entity that is external to the processing system 1900 through any communication protocol supported by the processing system 1900 and the external entity. The network adapter 1912 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1912 may include a firewall that governs and/or manages permission to access/proxy data in a computer network, and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A cryptocurrency rewards platform including a non-transitory computer-readable medium with instructions stored thereon that, when executed by a processor, cause the processor to perform operations comprising:
  integrating, via application programming interfaces (API), one or more of each of (i) financial institutions, (ii) cryptocurrency exchanges, (iii) payment processors, and (iv) digital wallets;
  receiving, from a financial institution via a first API, data related to transactions between an individual and one or more third parties using a specialized payment card over a period of time;
  normalizing the data related to transactions using the specialized payment card over the period of time;
  determining based on the normalized data, a value of transactions using the specialized payment card associated with the individual that satisfies an eligibility criterion;
  calculating a reward due to the individual based on the value of the transactions that satisfy the eligibility criterion;
  identifying a profile associated with the individual, wherein the profile identifies (i) the specialized payment card, (ii) a cryptocurrency, and (iii) a first digital wallet hosted on an exchange and associated with the individual;

identifying a second digital wallet associated with an amount of cryptocurrency sufficient to disburse the reward in a form of the cryptocurrency;

generating, in response to the operation of calculating the reward, a disbursement request specifying a disbursement of the reward from the second digital wallet to the first digital wallet;

causing the disbursement request to be included in a queue for processing;

determining a first time and date to distribute the amount of cryptocurrency from the second digital wallet to the first digital wallet, wherein determining the first time and the date is based at least in part on an average block time of a blockchain associated with the cryptocurrency;

sending via a second API, a first instruction to the exchange to transfer the amount of the cryptocurrency from the second digital wallet to the first digital wallet as the reward at the first time and the date;

verifying that the amount of the cryptocurrency has been transferred to the first digital wallet by completing a call to the exchange through the second API; and indicating in the profile that the transfer was completed successfully upon receiving an acknowledgement from the exchange in response to the call.

2. The cryptocurrency rewards platform of claim 1, wherein said completing step further comprises:
sending, via the second API, a second instruction to the exchange to purchase the second amount of cryptocurrency for storage in the second digital wallet.

3. The cryptocurrency rewards platform of claim 1, wherein the first instruction specifies a first address of the first digital wallet, a second address of the second digital wallet, and the amount of the cryptocurrency to be transferred from the second digital wallet to the first digital wallet.

4. The cryptocurrency rewards platform of claim 2, wherein the first and second digital wallets are hosted on different exchanges, and wherein said completing step comprises:
sending, via a third API, an instruction to a second exchange to purchase the second amount of cryptocurrency for transfer to the second digital wallet which is hosted on the second exchange.

5. A non-transitory computer-readable medium with instructions stored thereon that, when executed by a processor, cause the processor to perform operations comprising:
integrating, using a cryptocurrency rewards platform and via application programming interfaces (API), one or more of each of (i) financial institutions, (ii) cryptocurrency exchanges, (iii) payment processors, and (iv) digital wallets;

receiving, by the cryptocurrency rewards platform and via a first API from a financial institution, data related to transactions completed by a cardholder using a payment card over a period of time;

normalizing, by the cryptocurrency rewards platform, the data related to transactions completed by the cardholder over the period of time;

determining, by the cryptocurrency rewards platform, based on the normalized data, a value of transactions among the transactions completed by the cardholder that satisfy an eligibility criterion;

calculating, by the cryptocurrency rewards platform, a reward due to the cardholder based on (i) the value and (ii) a rewards criterion;

identifying, by the cryptocurrency rewards platform, a profile created by the cardholder during a registration procedure, wherein the profile identifies (i) the payment card, (ii) a cryptocurrency, and (iii) a cardholder wallet hosted on an exchange and associated with the cardholder;

generating, in response to the operation of calculating the reward, a disbursement request specifying a disbursement of the reward from a digital wallet to the cardholder wallet;

causing the disbursement request to be included in a queue for processing;

determining, a first time and date of to distribute the amount of cryptocurrency from the digital wallet to the cardholder wallet, wherein determining the first time and the date is based at least in part on an average block time of a blockchain associated with the cryptocurrency;

sending, by the cryptocurrency rewards platform and via a second API, an instruction to the exchange to transfer the amount of the cryptocurrency to the cardholder wallet as the reward at the first date and time; and applying, by the cryptocurrency rewards platform and in response to the instruction to transfer the amount of the cryptocurrency to the cardholder, the amount of the cryptocurrency to the cardholder wallet.

6. The non-transitory computer-readable medium of claim 5, wherein the operations further comprise periodically executing the instructions such that varying amounts of the cryptocurrency are disbursed to the cardholder on a daily basis based on a value of transactions completed by the cardholder in each period.

7. The non-transitory computer-readable medium of claim 5, wherein the operations further comprise executing the instructions responsive to determining that a total value of transactions that satisfy the eligibility criterion exceeds a threshold.

8. The non-transitory computer-readable medium of claim 5, wherein the operations further comprise:
identifying a corporate wallet hosted on the exchange from which the cryptocurrency is transferred.

9. The non-transitory computer-readable medium of claim 5, wherein the operations further comprise:
identifying a corporate wallet having sufficient assets to disburse the reward,
wherein the corporate wallet is one of multiple corporate wallets hosted by multiple exchanges.

10. The non-transitory computer-readable medium of claim 5, wherein the operations further comprise:
identifying a corporate wallet from which the cryptocurrency was transferred to the cardholder wallet;
identifying a minimum balance threshold for the corporate wallet;
determining that disbursement of the cryptocurrency to the cardholder wallet resulted in total assets falling beneath the minimum balance threshold; and
completing a purchase of cryptocurrency to ensure that the total assets in the corporate wallet meets the minimum balance threshold.

11. The non-transitory computer-readable medium of claim 5, wherein the operations further comprise processing disbursement requests in the queue in batches based on available processing capability, cryptocurrency type, and disbursement frequency.

12. The non-transitory computer-readable medium of claim 5, wherein the operations further comprise determining, by the cryptocurrency rewards platform, a balance of a pre-funded account, the balance indicating a total amount of cryptocurrency utilized for funding the cryptocurrency rewards platform.

13. A computer-implemented method comprising:
   integrating, using a cryptocurrency rewards platform and via application programming interfaces (API), one or more of each of (i) financial institutions, (ii) cryptocurrency exchanges, (iii) payment processors, and (iv) digital wallets;
   identifying, by the cryptocurrency rewards platform, transactions completed by a cardholder using a given payment card by examining data acquired from a payment processor responsible for facilitating the transactions;
   normalizing, by the cryptocurrency rewards platform, data relating to the transactions completed by the cardholder;
   calculating, by the cryptocurrency rewards platform, based on the normalized data a reward due to the cardholder for using the given payment card based on a total value of the transactions completed by the cardholder using the given payment card;
   generating, in response to the operation of calculating the reward, a disbursement request specifying a disbursement of an amount of cryptocurrency from a digital wallet to a cardholder wallet associated with the cardholder;
   causing the disbursement request to be included in a queue for processing;
   determining, a first time and date of when to distribute the amount of cryptocurrency from the digital wallet to the cardholder wallet, wherein determining the first time and the date is based at least in part on an average block time of a blockchain associated with the cryptocurrency; and
   causing, by the cryptocurrency rewards platform, cryptocurrency to be transferred to the cardholder wallet at the first time and date.

14. The computer-implemented method of claim 13, wherein the cryptocurrency is transferred to the cardholder wallet from a corporate wallet associated with a rewards program, and
   wherein the method further comprises:
   identifying the corporate wallet from amongst multiple corporate wallets based on an expected price to replace the cryptocurrency to be transferred to the cardholder wallet.

15. The computer-implemented method of claim 13, wherein the cryptocurrency is transferred to the cardholder wallet from a first corporate wallet associated with a rewards program, and
   wherein the method further comprises:
   sending an instruction to an exchange to transfer cryptocurrency from a second corporate wallet associated with the rewards program to the first corporate wallet.

16. The computer-implemented method of claim 13, further comprising:
   identifying a profile created by the cardholder during a registration procedure to discover a type of cryptocurrency to disburse as the reward.

17. The computer-implemented method of claim 13, wherein said causing comprises:
   sending an instruction to an exchange on which the cardholder wallet is hosted to transfer cryptocurrency from a corporate wallet to the cardholder wallet; and
   wherein the method further comprises:
   verifying that the cryptocurrency has been transferred by completing a call to the exchange via an application programming interface (API).

18. The computer-implemented method of claim 13, further comprising:
   verifying that the cryptocurrency has been transferred by:
   completing a call to a blockchain via an application programming interface (API) to request a number of confirmations, and
   ensuring that the number of confirmations exceeds a threshold value.

19. The computer-implemented method of claim 18, further comprising:
   indicating in a profile associated with the cardholder that the transfer was completed successfully in response to ensuring that the number of confirmations exceeds the threshold value.

20. The computer-implemented method of claim 13, further comprising calculating, by the cryptocurrency rewards platform, a balance of a pre-funded account, the balance indicating a total amount of cryptocurrency utilized for funding the cryptocurrency rewards platform.

* * * * *